(12) United States Patent
Hayakawa

(10) Patent No.: US 11,573,201 B2
(45) Date of Patent: Feb. 7, 2023

(54) METHOD AND SYSTEM FOR IDENTIFYING STRUCTURE OF COMPOUND

(71) Applicant: OKINAWA INSTITUTE OF SCIENCE AND TECHNOLOGY SCHOOL CORPORATION, Okinawa (JP)

(72) Inventor: Eisuke Hayakawa, Okinawa (JP)

(73) Assignee: OKINAWA INSTITUTE OF SCIENCE AND TECHNOLOGY SCHOOL CORPORATION, Okinawa (JP)

(*) Notice: Subject to any disclaimer, the term of this patent is extended or adjusted under 35 U.S.C. 154(b) by 0 days.

(21) Appl. No.: 17/251,523

(22) PCT Filed: Jun. 14, 2019

(86) PCT No.: PCT/JP2019/023780
§ 371 (c)(1),
(2) Date: Dec. 11, 2020

(87) PCT Pub. No.: WO2019/240289
PCT Pub. Date: Dec. 19, 2019

(65) Prior Publication Data
US 2021/0247360 A1    Aug. 12, 2021

(30) Foreign Application Priority Data
Jun. 15, 2018 (JP) .............................. JP2018-114216

(51) Int. Cl.
*H01J 49/00* (2006.01)
*G01N 27/623* (2021.01)

(52) U.S. Cl.
CPC ........ *G01N 27/623* (2021.01); *H01J 49/0036* (2013.01)

(58) Field of Classification Search
CPC . G01N 27/623; H01J 49/0036; H01J 49/0045
(Continued)

(56) References Cited

U.S. PATENT DOCUMENTS

| 10,573,501 B2 | 2/2020 | Geromanos et al. |
| 2015/0160231 A1* | 6/2015 | Meitei ............... G01N 33/6851 702/22 |

(Continued)

FOREIGN PATENT DOCUMENTS

| JP | 2018-517905 | 7/2018 | |
| WO | 2017/036545 | 3/2017 | |
| WO | WO-2017036545 A1 * | 3/2017 | ........... G01N 27/622 |

OTHER PUBLICATIONS

International Search Report dated Aug. 13, 2019 in International (PCT) Application No. PCT/JP2019/023780.
(Continued)

*Primary Examiner* — Michael Maskell
(74) *Attorney, Agent, or Firm* — Wenderoth, Lind & Ponack, L.L.P.

(57) ABSTRACT

The present invention relates to a method for identifying a chemical structure of a wide variety of low molecular weight compounds using mass-to-charge ratio and collision cross section of fragment ions of an analyte compound. The analyte compound is ionized and fragmented, and the fragment ions are measured by a mass spectrometer with an ion mobility spectrometry measurement device. According to the present method, it does not depend on any compound class-specific characteristics or structural features, therefore enabling determinations of any classes of low molecular weight compounds, which does not limit to a specific compound class. The present invention comprises three methods which share a common data structure and s data processing method.

15 Claims, 13 Drawing Sheets

(58) Field of Classification Search
USPC .................................................. 250/281, 282
See application file for complete search history.

(56) References Cited

U.S. PATENT DOCUMENTS

| 2018/0088094 A1 | 3/2018 | Yu et al. |
| 2018/0166265 A1 | 6/2018 | Geromanos et al. |
| 2018/0246062 A1 | 8/2018 | Hofmann et al. |
| 2020/0266042 A1 | 8/2020 | Geromanos et al. |

OTHER PUBLICATIONS

Tsugawa et al., "The Guide for Metabolite Annotation/Identification in Untargeted Metabolomics", J. Mass Spectrom. Soc. Jpn., 2017, pp. 203-209.
Paglia et al., "Ion Mobility Derived Collision Cross Sections to Support Metabolomics Applications", analytical chemistry, 2014, vol. 86, pp. 3985-3993.
Peironcely "OMG: Open Molecule Generator", Journal of Cheminformatics, 2012, vol. 4, No. 21, pp. 1-13.
International Preliminary Report on Patentability dated Dec. 15, 2020 in International (PCT) Application No. PCT/JP2019/023780.

* cited by examiner

METHOD AND SYSTEM FOR IDENTIFYING STRUCTURE OF COMPOUND

TECHNICAL FIELD

The present invention relates to a method and a system for identifying the structure of a compound.

BACKGROUND ART

It is important to identify the structure of a compound such as a low molecular weight compound: metabolites, natural products, drugs, pollutants and the like in various kinds of fields such as the fields of physiology, medicine, food, environment and the like. According to such an identification of the structure of a compound, for example, identification of useful natural products, specification of pollutants, development of biomarkers, and the like are enabled.

As a technique for identifying the structure of a compound, for example, there may be mentioned mass spectrometry. The mass spectrometry is used in the field of analytical chemistry, biopharmaceuticals and environmental research/industry, for identifying the structure of a compound. In the mass spectrometry method, for example, first, a compound contained in a sample is separated by liquid chromatography, the separated compound is ionized and a mass spectrum is acquired.

In the mass spectrometry, information on mass-to-charge ratios of the precursor ion of an analyte compound and fragment ions generated by cleaving it is acquired and utilized for estimating the structure of the compound in some cases, but particularly for low molecular weight compound cases, a number of observed fragment ions is small in many cases, and it is difficult to estimate the cleavage site in the structure, and further a number of candidate structures to be considered is enormous so that it is difficult to identify the structure of the compound with the information of mass spectrometry alone.

In recent years, there exist an analytical instrument in which mass spectrometry and ion mobility spectrometry are integrated, and there is an example (Patent Document 1) in which information on the collision cross section of a precursor ion of an analyte compound measured by such an instrument is matched to information stored in a database in which values of the mass-to-charge ratio and collision cross section acquired by measuring standard compounds in advance, but in this method, there is a problem that the compound whose structure can be determined depends on standard compounds.

PRIOR ART DOCUMENT

Patent Document

Patent Document: JP 2018-517905A

SUMMARY OF THE INVENTION

Problems to be Solved by the Invention

Thus, an object of the present invention is to provide a method and a system for identifying a structure, which can identify structures of various kinds of compounds.

Means to Solve the Problems

A first method for identifying the structure of a compound of the present invention comprises, matching the spectral data in which measured mass-to-charge ratios (m/z) and collision cross sections (CCS) of fragment ions of an analyte compound are combined, to spectral data in a reference spectral database in which structure information on fragment ions of a standard compound and mass-to-charge ratios and collision cross sections of fragment ions thereof are combined.

A second method for identifying the structure of a compound of the present invention comprises, deducing a mass and/or elemental composition of an analyte compound from the mass-to-charge ratios (m/z) of the fragment ions and the precursor ion of the analyte compound, acquiring a candidate structure by searching from chemical structures included in a chemical structure database based on the deduced mass and/or elemental composition of the analyte compound or generating a theoretically existing structure based on the elemental composition, acquiring structures of estimated fragment ions of the candidate structure by systematic bond cleavage or a fragmentation prediction model, acquiring collision cross sections (CCS) of the estimated fragment ions by searching from a reference spectral database in which structures, mass-to-charge ratios and collision cross sections of fragment ions of a standard compound are combined and a theoretical spectral database including structures of fragment ions and theoretically calculated CCSs, or by calculation and prediction based on the structures of the estimated fragment ions, and, matching the measured m/z ratios and CCSs of fragment ions of the analyte compound to the acquired m/z ratios and CCSs of the estimated fragment ions of the candidate structure.

A third method for identifying the structure of a compound of the present invention comprises, matching measured mass-to-charge ratios (m/z) and collision cross sections (CCS) of fragment ions of an analyte compound to a reference spectral database in which structures, mass-to-charge ratios and collision cross sections of fragment ions of a standard compound are combined and a theoretical spectral database including structures of fragment ions and theoretically calculated CCSs thereof, acquiring a registered structure of fragment ions matched with a predetermined tolerance as a potential substructure of the analyte compound, acquiring a candidate structure of the analyte compound by searching a chemical structure having the substructure in a chemical structure database, acquiring structures of estimated fragment ions of the candidate structure by systematic bond cleavage or a fragmentation prediction model, acquiring CCSs of the estimated fragment ions by searching from a reference spectral database in which structures, mass-to-charge ratios and collision cross sections of fragment ions of a standard compound are combined and a theoretical spectral database including structures of fragment ions and theoretically calculated CCSs thereof, or by calculation and prediction based on the structures of the estimated fragment ions, and matching the measured m/z ratios and CCSs of fragment ions of the analyte compound to the m/z ratios and the acquired CCSs of the estimated fragment ions of the candidate structure.

A system for identifying the structure of the compounds of the present invention comprises, a spectral data generation means for generating spectral data in which measured mass-to-charge ratios (m/z) and collision cross sections (CCS) of fragment ions of an analyte compound are combined, from a result of mass spectrometry of the analyte compound, a reference spectral database including reference spectral data in which structures of fragment ions of a standard compound and mass-to-charge ratios and collision cross sections of fragment ions thereof are combined, a theoretical spectral database including structures of fragment ions and theoretically calculated CCSs thereof, a matching means for matching the spectral data to data in the reference spectral database and the theoretical spectral database, a candidate information generation means for generating a candidate structure from structural information in the reference spectral database and the theoretical spectral database, and an output means for outputting a result obtained by the matching means, wherein the spectral data generation means and the output means are connected to the reference spectral database, the theoretical spectral database, the candidate information generation means and the matching means via a communication network outside the system.

Effects of the Invention

According to the present invention, it is possible to provide a method and a system for identifying the structure of a compound, which can identify the structures of various compounds.

EMBODIMENT TO CARRY OUT THE INVENTION

Figure 1:
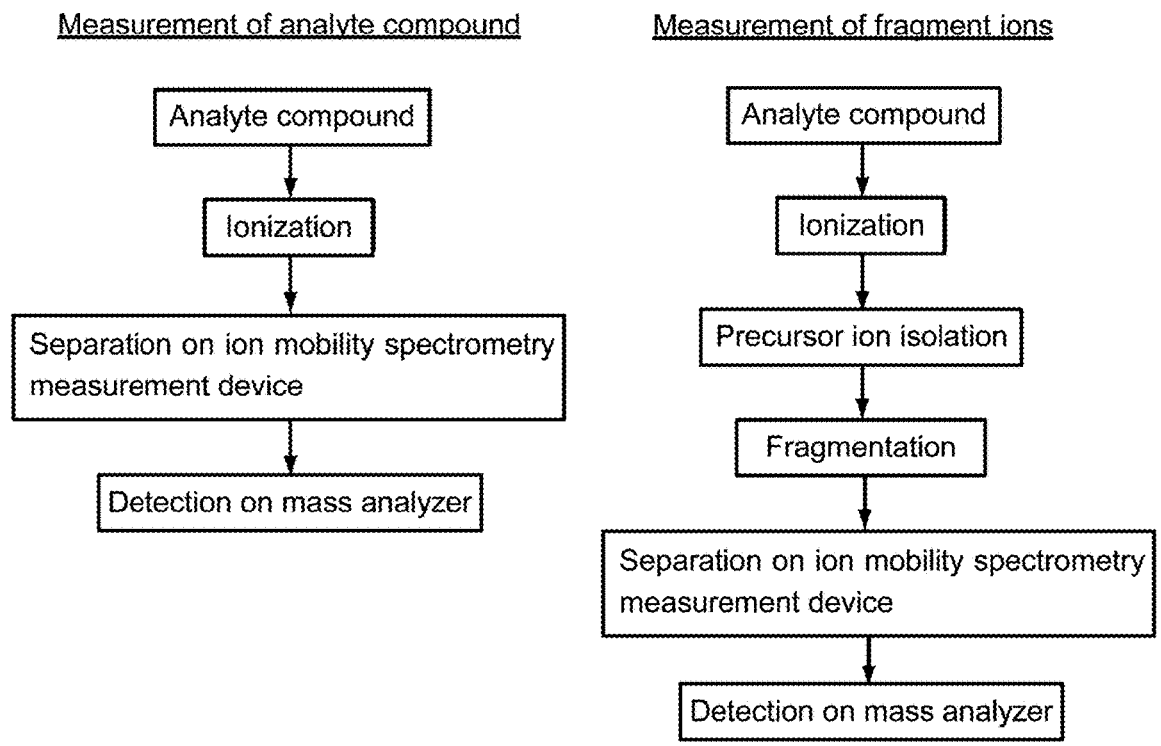
FIG. 1 is a flow chart showing an example of an analysis procedure by mass spectrometry and ion mobility spectrometry for an analyte compound.

Item 1. A method for identifying the structure of a compound, which comprises (matching step of) matching the spectral data in which measured mass-to-charge ratios (m/z) and collision cross sections (CCS) of fragment ions of an analyte compound are combined, to spectral data in a reference spectral database in which structure information on fragment ions of a standard compound and mass-to-charge ratios and collision cross sections of fragment ions thereof are combined.

Item 2. The method according to Item 1, which further comprises constructing a database including structure information and, data of mass-to-charge ratios and collision cross sections of fragment ions of a standard compound.

Item 3. The method according to Item 1 or 2, which further comprises (spectral data generation step of) generating spectral data by subjecting the fragment ions of the analyte compound to mass spectrometry analysis and ion mobility analysis.

Item 4. The method according to any one of Items 1 to 3, which further comprises matching the compound spectral data in which the measured m/z and CCS of the precursor ion of the analyte compound are combined, to precursor ion reference spectral data in which structure of precursor ion of the standard compound and m/z and CCS of the same precursor ion are combined.

Item 5. The method according to Item 4, which further comprises generating precursor ion spectral data by subjecting the precursor ion of the analyte compound to mass spectrometry analysis and ion mobility analysis.

Item 6. The method according to any one of Items 1 to 5, wherein in matching, the ones that have masses matched to the observed mass-to-charge ratios of fragment ions of the analyte compound are searched from fragment ions of the standard compounds in the reference spectral data as candidates, with regard to each candidate, both the mass-to-charge ratio and collision cross section are matched with a predetermined tolerance between the spectral data of the analyte compound and the reference spectral database to calculate matching scores, and the candidate showing a top score is determined as a real structure of fragment ion of the analyte compound.

Item 7. A method for identifying the structure of a compound, which comprises (mass-elemental composition deduction step of) deducing a mass and/or elemental composition of an analyte compound from the mass-to-charge ratios (m/z) of the fragment ions and the precursor ion of the analyte compound, (candidate structure acquisition step of) acquiring a candidate structure by searching from chemical structures included in a chemical structure database based on the deduced mass and/or elemental composition of the analyte compound or generating a theoretically existing structure based on the elemental composition, (estimated fragment ion structure acquisition step of) acquiring structures of estimated fragment ions of the candidate structure by systematic bond cleavage or a fragmentation prediction model, (estimated fragment ion collision cross section acquisition step of) acquiring collision cross sections (CCS) of the estimated fragment ions by searching from a reference spectral database in which structures, mass-to-charge ratios and collision cross sections of fragment ions of a standard compound are combined and a theoretical spectral database including structures of fragment ions and theoretically calculated CCSs, or by calculation and prediction based on the structures of the estimated fragment ions, and, (matching) matching the measured m/z ratios and CCSs of fragment ions of the analyte compound to the acquired m/z ratios and CCSs of the estimated fragment ions of the candidate structure.

Item 8. The method according to Item 7, wherein in acquiring a candidate structure, instead of or in addition to acquiring a candidate structure from chemical structures included in a chemical structure database, a candidate structure is acquired from chemical structures generated with an algorithm of molecular structure generation for generating a theoretically possible structure based on the estimated elemental composition of the analyte compound.

Item 9. The method according to Item 7 or 8, wherein in matching, the measured m/z ratios and CCSs of fragment ions of the analyte compound are matched to the m/z ratios and the acquired CCSs of the estimated fragment ions of the candidate structures, and with regard to each candidate structure, a matching score is calculated based on the number of matched pairs of the mass-to-charge ratio and collision cross section and peak intensities of the fragment ions, and the candidate showing a top score is determined as an real structure of the fragment ion of the analyte compound.

Item 10. A method for identifying the structure of a compound, which comprises (first matching step of) matching measured mass-to-charge ratios (m/z) and collision cross sections (CCS) of fragment ions of an analyte compound to a reference spectral database in which structures, mass-to-charge ratios and collision cross sections of fragment ions of a standard compound are combined and a theoretical spectral database including structures of fragment ions and theoretically calculated CCSs thereof, (substructure acquisition step of) acquiring a registered structure of fragment ions matched with a predetermined tolerance as a potential substructure of the analyte compound, (candidate structure acquisition step of) acquiring a candidate structure of the analyte compound by searching a chemical structure having the substructure in a chemical structure database, (candidate structure generation step of) generating a theoretically possible candidate structure based on the substructure and the elemental composition, (estimated fragment ion structure acquisition step of) acquiring structures of estimated fragment ions of the candidate structure by systematic bond cleavage or a fragmentation prediction model, (estimated fragment ion collision cross section acquisition step of) acquiring CCSs of the estimated fragment ions by searching from a reference spectral database in which structures, mass-to-charge ratios and collision cross sections of fragment ions of a standard compound are combined and a theoretical spectral database including structures of fragment ions and theoretically calculated CCSs thereof, or by calculation and prediction based on the structures of the estimated fragment ions, and (second matching step of) matching the measured m/z ratios and CCSs of fragment ions of the analyte compound to the m/z ratios and the acquired CCSs of the estimated fragment ions of the candidate structure.

Item 11. The method according to Item 10, wherein in acquiring a candidate structure, instead of acquiring a candidate structure by searching a chemical structure having the substructure in a chemical structure database, a candidate substructure is acquired by matching the observed mass-to-charge ratios and collision cross sections of the fragment ions to a reference spectral database in which structures, mass-to-charge ratios and collision cross sections of fragment ions of a standard compound are combined and a theoretical spectral database including structures of fragment ions and theoretically calculated CCSs thereof, and a candidate structure is acquired from chemical structures generated with an algorithm of molecular structure generation for generating a theoretically possible structure based on the substructure and the estimated elemental composition of the analyte compound.

Item 12. The method according to Item 10 or 11, wherein in the first matching, the ones that have masses matched to the observed mass-to-charge ratios of fragment ions of the analyte compound are searched from fragment ions of the standard compounds in the reference spectral data as candidates, with regard to each candidate, both the mass-to-charge ratio and collision cross section are matched with a predetermined tolerance between the spectral data of the analyte compound and the reference spectral database to calculate matching scores, and the candidate showing a top score is determined as a real structure of fragment ion of the analyte compound, in the second matching, the measured m/z ratios and CCSs of fragment ions of the analyte compound are matched to the m/z ratios and the acquired CCSs of the estimated fragment ions of the candidate structures, and with regard to each candidate structure, a matching score is calculated based on the number of matched pairs of the mass-to-charge ratio and collision cross section and peak intensities of the fragment ions, and the candidate showing a top score is determined as an real structure of the fragment ion of the analyte compound.

Item 13. A system for identifying the structure of a compound, which comprises a spectral data generation means for generating spectral data in which measured mass-to-charge ratios (m/z) and collision cross sections (CCS) of fragment ions of an analyte compound are combined, from a result of mass spectrometry of the analyte compound, a reference spectral database including reference spectral data in which structures of fragment ions of a standard compound and mass-to-charge ratios and collision cross sections of fragment ions thereof are combined, a theoretical spectral database including structures of fragment ions and theoretically calculated CCSs thereof, a matching means for matching the spectral data to data in the reference spectral database and the theoretical spectral database, a means for generating a candidate structure from structural information in the reference spectral database and the theoretical spectral database, and an output means for outputting a result obtained by the matching means, wherein the spectral data generation means and the output means are connected to the reference spectral database, the theoretical spectral database, the candidate information generation means and the matching means via a communication network outside the system.

Item 14. The system according to Item 13, wherein the matching means searches the ones that have masses matched to the observed mass-to-charge ratios of fragment ions of the analyte compound from fragment ions of the standard compounds in the reference spectral data as candidates, calculates matching scores by matching both the mass-to-charge ratio and collision cross section between the spectral data of the analyte compound and the reference spectral database with a predetermined tolerance with regard to each candidate, and determines the candidate showing a top score as a real structure of fragment ion of the analyte compound.

Item 15. A system for identifying the structure of a compound, which comprises a spectral data generation means for generating spectral data in which measured mass-to-charge ratios (m/z) and collision cross sections (CCS) of fragment ions of an analyte compound are combined, from a result of mass spectrometry of the analyte compound, a mass-elemental composition deduction means for deducing a mass and/or elemental composition of an analyte compound from the mass-to-charge ratios (m/z) of the fragment ions and the precursor ion of the analyte compound, a chemical structure database, a candidate structure acquisition means for acquiring a candidate structure from chemical structures included in the chemical structure database based on the deduced mass and/or elemental composition of the analyte compound, an estimated fragment ion structure acquisition means for acquiring structures of estimated fragment ions of the candidate structure by systematic bond cleavage or a fragmentation prediction model, a theoretical spectral database including structures of fragment ions and theoretically calculated CCSs, an estimated fragment ion collision cross section acquisition means for acquiring collision cross sections (CCS) of the estimated fragment ions by searching from the theoretical spectral database or by calculation and prediction based on the structures of the estimated fragment ions, a matching means for matching the measured m/z ratios and CCSs of fragment ions of the analyte compound to the acquired m/z ratios and CCSs of the estimated fragment ions of the candidate structure, and an output means for outputting a result obtained by the matching means, wherein the spectral data generation means and the output means are connected to the mass-elemental composition deduction means, the chemical structure database, the candidate structure acquisition means, the estimated fragment ion structure acquisition means, the theoretical spectral database, the estimated fragment ion collision cross section acquisition means and the matching means via a communication network outside the system.

Item 16. The system according to Item 13, wherein the matching means matches the measured m/z ratios and CCSs of fragment ions of the analyte compound to the m/z ratios and the acquired CCSs of the estimated fragment ions of the candidate structures, calculates a matching score based on the number of matched pairs of the mass-to-charge ratio and collision cross section and peak intensities of the fragment ions with regard to each candidate structure, and determines the candidate showing a top score as an real structure of the fragment ion of the analyte compound.

Item 17. A system for identifying the structure of a compound, which comprises a spectral data generation means for generating spectral data in which measured mass-to-charge ratios (m/z) and collision cross sections (CCS) of fragment ions of an analyte compound are combined, from a result of mass spectrometry of the analyte compound, a first matching means for matching measured mass-to-charge ratios (m/z) and collision cross sections (CCS) of fragment ions of an analyte compound to mass-to-charge ratios and collision cross sections of fragment ions of a standard compound, a substructure acquisition means for acquiring a registered structure of fragment ions of the standard compound matched with a predetermined tolerance as a potential substructure of the analyte compound, a chemical structure database, a candidate structure acquisition means for acquiring a candidate structure of the analyte compound by searching a chemical structure having the substructure in the chemical structure database, an estimated fragment ion structure acquisition means for acquiring structures of estimated fragment ions of the candidate structure by systematic bond cleavage or a fragmentation prediction model, a theoretical spectral database including structures of fragment ions and theoretically calculated CCSs thereof, an estimated fragment ion collision cross section acquisition means for acquiring CCSs of the estimated fragment ions by searching from a theoretical spectral database or by calculation and prediction based on the structures of the estimated fragment ions, a second matching means for matching the measured m/z ratios and CCSs of fragment ions of the analyte compound to the m/z ratios and the acquired CCSs of the estimated fragment ions of the candidate structure, and an output means for outputting a result obtained by the second matching means, wherein the spectral data generation means and the output means are connected to the first matching means, the substructure acquisition means, the chemical structure database, the candidate structure acquisition means, the estimated fragment ion structure acquisition means, the theoretical spectral database, the estimated fragment ion collision cross section acquisition means and the second matching means via a communication network outside the system.

Item 18. The system according to Item 17, wherein the first matching means searches the ones that have masses matched to the observed mass-to-charge ratios of fragment ions of the analyte compound from fragment ions of the standard compounds in the reference spectral data as candidates, calculates matching scores by matching both the mass-to-charge ratio and collision cross section between the spectral data of the analyte compound and the reference spectral database with a predetermined tolerance with regard to each candidate, and determines the candidate showing a top score as a real structure of fragment ion of the analyte compound, the second matching means matches the measured m/z ratios and CCSs of fragment ions of the analyte compound to the m/z ratios and the acquired CCSs of the estimated fragment ions of the candidate structures, calculates a matching score based on the number of matched pairs of the mass-to-charge ratio and collision cross section and peak intensities of the fragment ions with regard to each candidate structure, and determines the candidate showing a top score as an real structure of the fragment ion of the analyte compound.

Item 19. An apparatus for identifying the structure of a compound, which comprises a means for generating spectral data in which measured mass-to-charge ratios (m/z) and collision cross sections (CCS) of fragment ions of an analyte compound are combined, from a result of mass spectrometry of the analyte compound, a reference spectral database including reference spectral data in which structures of fragment ions of a standard compound and mass-to-charge ratios and collision cross sections of fragment ions thereof are combined, a means for matching the spectral data to reference spectral data, and a means for outputting a matching result.

Item 20. A method for identifying the structure of a compound, which comprises generating spectral data in which measured mass-to-charge ratios (m/z) and collision cross sections (CCS) of fragment ions of an analyte compound are combined, from a result of mass spectrometry of the analyte compound, matching the spectral data to reference spectral data in a reference spectral database including reference spectral data in which structures of fragment ions of a standard compound and mass-to-charge ratios and collision cross sections of fragment ions thereof are combined, a theoretical spectral database including structures of fragment ions and theoretically calculated CCSs thereof, a matching means for matching the spectral data to data in the reference spectral database and the theoretical spectral database, a means for generating a candidate structure from structural information in the reference spectral database and the theoretical spectral database, and an output means for outputting a result obtained by the matching means.

Next, embodiments of the present invention will be explained. Incidentally, the present invention is not limited or restricted by the embodiments mentioned below. In FIGS. 1 to 19, an abbreviation "DB" may be sometimes used, which is an abbreviation for "database".

First Embodiment

The first embodiment of the present invention is the above-mentioned method for identifying the structure of a compound, and the subject of the method is a person. In the present embodiment, among the procedures carried out by a person, a procedure that can be also interpreted as being carried out on a computer can be interpreted as, for example, a person makes the computer to carry out a corresponding procedure. The present embodiment includes, as mentioned above, the reference spectral data derived from the standard compound and the reference spectral data generation of theoretically generating from known compound structures, and the calculation of mass-to-charge ratio and collision cross section from fragment structure and the matching step.

Figure 2:
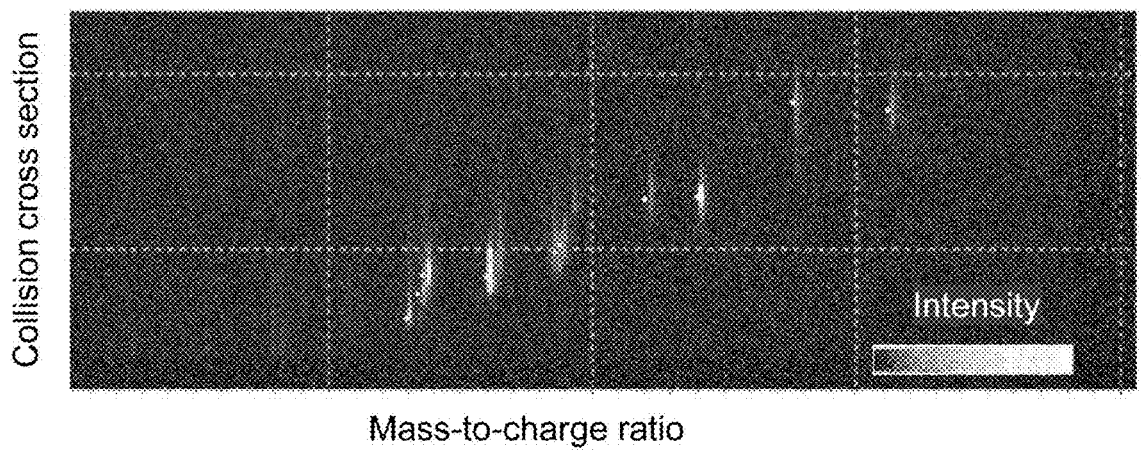
FIG. 2 is a photograph showing an example of spectral data of fragment ions.

1. Compound Spectral Data Generation Step 1-1. Measurements for Mass-to-Charge Ratio and Collision Cross Section In this step, the precursor ion and fragment ions of the ionized compound are measured by mass spectrometry and ion mobility spectrometry to generate spectral data. In order to generate the said data, first, the mass-to-charge ratio and collision cross section of the fragment ions of the analyte compound are measured. Specifically, for example, the analyte compound is analyzed by mass spectrometry and ion mobility spectrometry (FIGS. 1 and 2). In this case, usually, in addition to measurement for the mass-to-charge ratio and collision cross section of the fragment ions, measurements for the mass-to-charge ratio and collision cross section of the precursor ion are also carried out. Specifically, for example, as shown on the left side (the precursor ion of the compound) and the right side (fragment ions) of FIG. 1, mass spectrometry and ion mobility spectrometry are carried out. First, the analyte compound is ionized with an ion source on a mass spectrometry instrument. As an ion source, there may be mentioned, for example, electrospray ionization, atmospheric pressure photoionization, electron impact ionization, desorption electrospray ionization, matrix-assisted laser desorption ionization and other related methods, but the ion source is not limited to these. The mass-to-charge ratio is measured with a mass analyzer such as a Fourier transform ion cyclotron resonance, time-of-flight, Orbitrap or other analyzer. The collision cross section is acquired by measuring the drift time by separating the precursor ion of the compound with an ion mobility spectrometry measurement device such as a drift tube, traveling wave, high field asymmetric waveform device. The collision cross section is acquired by calibrating with drift times of a calibration curve of the standard compound whose collision cross section is already known. In FIG. 2, an example of spectral data of fragment ions is shown.

Information on fragment ions of the analyte compound is acquired as follows. First, the precursor ion of the analyte compound is isolated by applying a mass filter such as quadrupole or ion trap device equipped with the mass spectrometry instrument. Then, fragmentation of the precursor ion of the analyte compound is caused by using a fragmentation device such as collision-induced dissociation, high-energy collision-induced dissociation, electron capture dissociation or electron transfer dissociation. Also, fragment ions can be acquired when the analyte compound is measured by gas chromatography, since it causes electron transfer dissociation.

Figure 3:
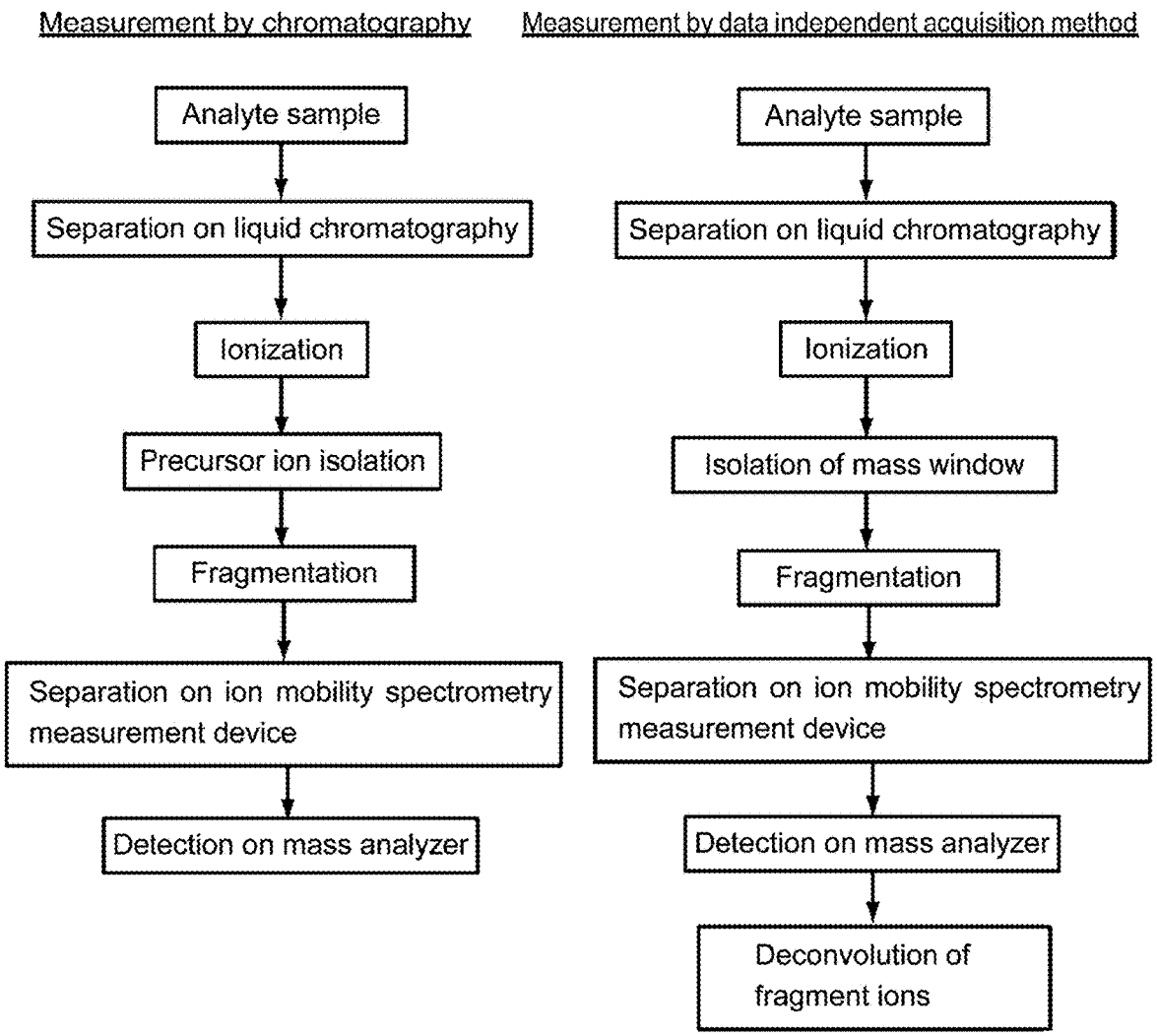
FIG. 3 is a flow chart showing an example of an analysis procedure when an analyte sample containing multiple compounds is analyzed.

When analysis is carried out for a sample containing multiple compounds, these compounds are first separated by a chromatography method such as liquid chromatography, capillary electrophoresis or supercritical fluid chromatography (FIG. 3, left side). The precursor ions of the compound detected in each scan are then measured as mentioned above. When an analyte sample is separated using gas chromatography, the mass-to-charge ratios and collision cross sections of the fragment ions derived from each compound are generated by deconvoluting the fragment ions.

Alternatively, when analysis is carried out by coupling a mass spectrometry instrument to a compound separation instrument such as liquid chromatography, capillary electrophoresis or supercritical fluid chromatography, the fragment ions of the analyte compound are acquired by data independent acquisition method such as SWATH (FIG. 3, right side). In the data independent acquisition method, the precursor ions of the analyte compound within a narrow mass window are isolated and subjected to fragmentation. This process is repeated and stepped across the entire mass range of analysis. Fragment ions derived from a precursor compound can be acquired by deconvolution of fragment ions data-independent acquisition data (Tsugawa et al., Nat Methods. 12: 523-6 (2015)).

2. Matching Step

In this step, the spectral data in which the measured mass-to-charge ratios and collision cross sections of the fragment ions of the analyte compound are combined is matched to the reference spectral data in which the values of the mass-to-charge ratio and collision cross section of the fragment ions acquired by measuring a standard compound and estimated structures of the fragment ions are described. The matching method will be mentioned later.

2-1. Reference Spectral Database

The above-mentioned spectral data (reference spectral data) of standard compounds are, for example, included in a reference spectral database. This database is used for structure identification of the analyte compound. For example, this database may be stored in an auxiliary storage device of each user's client terminal, or may be stored in a server. In the present invention, for example, the user may use a previously constructed reference spectral database, or may construct a reference spectral database and use it, or may update a reference spectral database by including the previously generated spectral data of the analyte compound in the reference spectral database.

2-2. Construction of Reference Spectral Database

Figure 4:
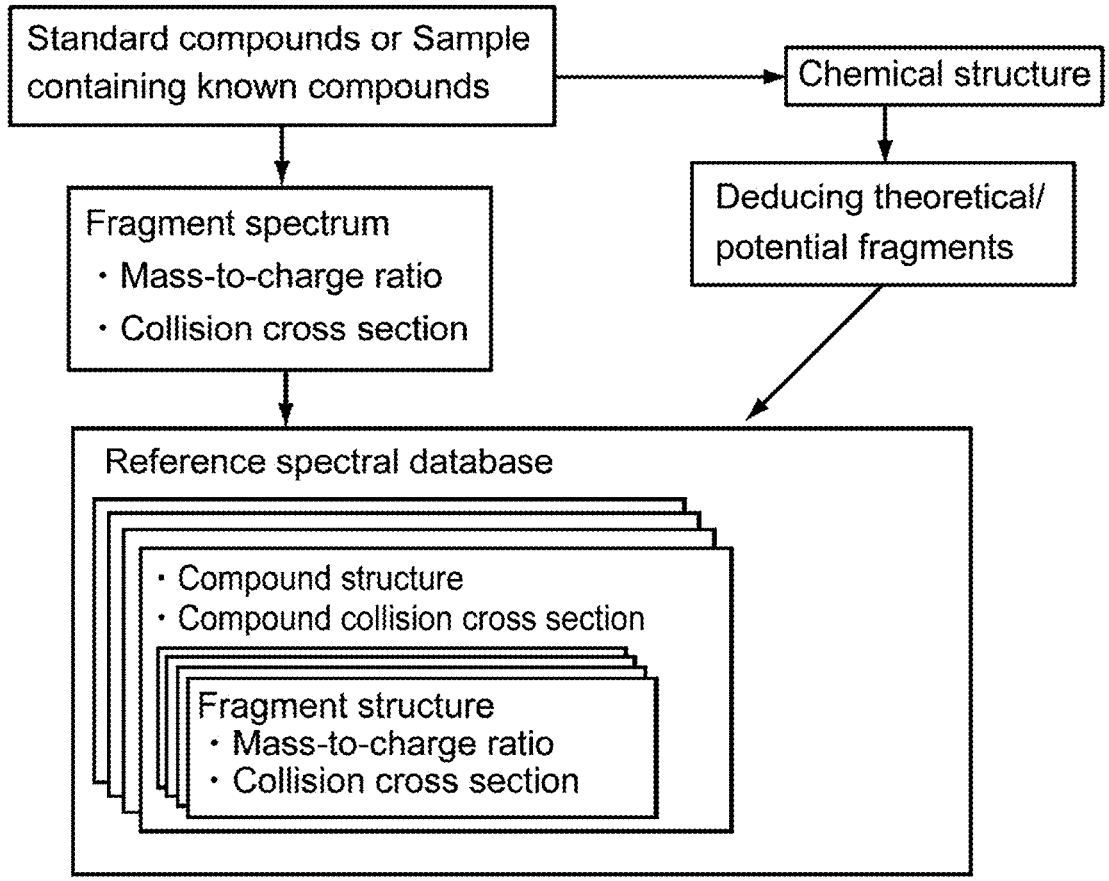
FIG. 4 is a diagram showing an example of a procedure for constructing a reference spectral database.

As mentioned above, for example, a reference spectral database including reference spectral data of standard compounds having known structures can be constructed. For example, a reference spectral database can be constructed by measuring mass-to-charge ratios and collision cross sections of fragment ions of standard compounds in the same manner as the measurement for the above-mentioned mass-to-charge ratios and collision cross sections of an analyte compound, and combining with the structures of the fragment ions of the standard compounds to generate reference spectral data (FIG. 4). As the standard compound, for example, there may be mentioned a chemically synthesized standard compound, and also mentioned a compound isolated from a standard sample (for example, animal and plant tissue extracts, environmental and medical samples), whose presence and structure is already described in a literature. In addition, in the present invention, a compound in which the spectral data has been previously generated and the structure has been identified can be also used as a standard compound.

First, with regard to a standard compound or a standard sample, mass-to-charge ratios and collision cross sections of the precursor ions of these compounds are measured, and these values are stored in a database together with the structures of these compounds. Then, the above-mentioned precursor ions of the compounds are fragmented, mass-to-charge ratios and collision cross sections of the fragment ions are measured, and these values are stored in the database.

The structures of the measured fragment ions of the standard compound are estimated as follows. Specifically, for example, the structures of theoretical and potential fragment ions are calculated by systematically cleaving covalent bonds in the structure of the standard compound (the precursor ion of the compound), and the mass-to-charge ratio of the calculated structure is calculated from this structure. When the calculated mass-to-charge ratio matches to the value of the observed fragment ion, the structure of the matched fragment ion is registered as the possible structure of the fragment ion together with the measured mass-to-charge ratio and collision cross section.

Alternatively, in order to estimate the structures of the observed fragment ions of the standard compound, for example, fragmentation model and structure rearrangement accompanied thereby are applied to the molecular structure of the standard compound. This structure estimation can be achieved by, for example, fragment prediction such as a fragmentation prediction tool CFM-predict (Allen et al., Nucleic Acids Re. s 42: W94-9 (2014)) which is a machine learning model that is trained with fragmentation spectral data and molecular structures as inputs. Also, fragmentation rules and mechanisms collected from published literatures are applied to the chemical structures of the standard compounds (the precursor ions of the compounds) to predict the structures of the fragment ions. This prediction can be achieved by, for example, scanning substructure with SMARTS pattern matching using a substructure library RDKit. A tool for predicting a fragment structure by applying a fragmentation rule such as Mass Frontier (Thermo Fisher Science) is also used for generating a fragmentation structure by applying a fragmentation rule. The fragmentation structures whose mass-to-charge ratios match to the peaks in the measured fragment spectrum are added to the entry of the compound together with the observed mass-to-charge ratios and collision cross sections.

Hereinafter, the above-mentioned matching step will be mentioned in detail. In the present step, reference spectral data included in the reference spectral database is used, so that the present method is sometimes referred to as reference spectral database-dependent method. Incidentally, the system mentioned in detail below is an example, and does not limit the present invention in any way.

Figure 5:
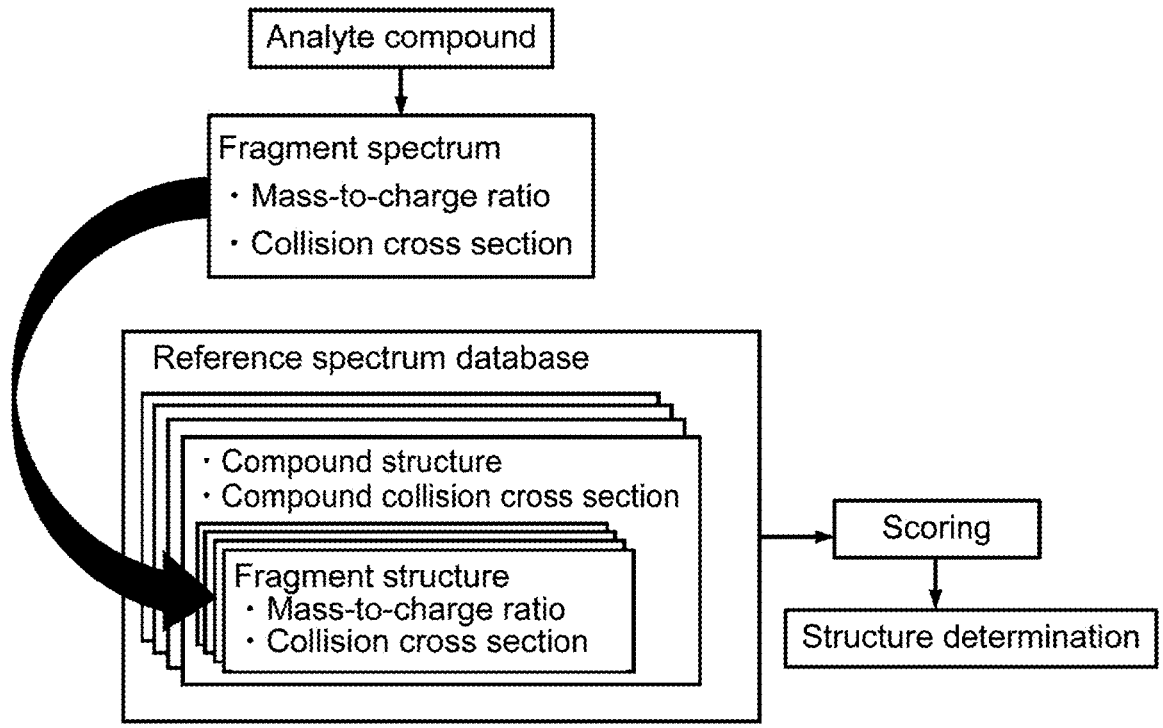
FIG. 5 is a diagram showing an outline of an example (Embodiment 1) of the method of the present invention.

By comparing the spectral data of the analyte compound with the reference spectral data, the present step is accomplished. In FIG. 5, an example of the present embodiment is shown. First, among the fragment ions of the standard compounds, compounds whose masses match to the observed mass-to-charge ratios are searched from the reference spectral data as candidates to make them compound entries. For each candidate, comparison of masses and ion-mobility peaks in the spectral data of the analyte compound and the reference spectral database is carried out by matching both the mass-to-charge ratios and collision cross sections with a predetermined tolerances. To evaluate the candidates, the following score function is utilized $$\sum_{i=0}^{m} P_i I_i \qquad \text{[Numerical formula 1]}$$

wherein, m is a number of fragment ions in the reference spectral data of the candidate compound. When the mass-to-charge ratio and collision cross section of a fragment ion in the reference spectral data match to the mass-to-charge ratio and collision cross section of a measured fragment ion of the analyte compound, then $P_i=1$. When the mass-to-charge ratio and collision cross section of a fragment ion in the reference spectral data do not match to the mass-to charge ratio or collision cross section of a measured fragment ion of the analyte compound, then $P_i=0$. $I_i$ is the intensity of a peak in the measured spectrum. The acquired scores are used to compare candidates, and the candidate showing the top score is determined to be the real structure of the analyte compound. Incidentally, for evaluation of the candidate, not only the above-mentioned function is strictly utilized, but also a similar function that considers the number of matched fragment ions and those signal intensities can be utilized.

As mentioned above, by matching the spectral data of the analyte compound to the reference spectral database, the method of the present embodiment can identify the structures of various compounds.

In the prior art, only the ion mobility of the compound itself (the precursor ion) is utilized, and the ion mobilities of the fragment ions are not utilized. Accordingly, compound structural identification is possible only when there is already the actual measurement date for the same compound. And in a current ion mobility analyzer, a collision cross section information of a precursor ion does not have sufficient resolution for identifying the compound, and there are cases where a plurality of compounds have the same collision cross section, so that it is virtually impossible to identify the structure from a huge number of candidate structures. On the other hand, the method of the present embodiment can identify the structure of a compound with high precision even when candidate structures are enormous and also resolution of a ion mobility analyzer is not sufficient because the collision cross sections which reflect unique structures of a plurality of fragment ions derived from the compound are utilized.

Figure 14:
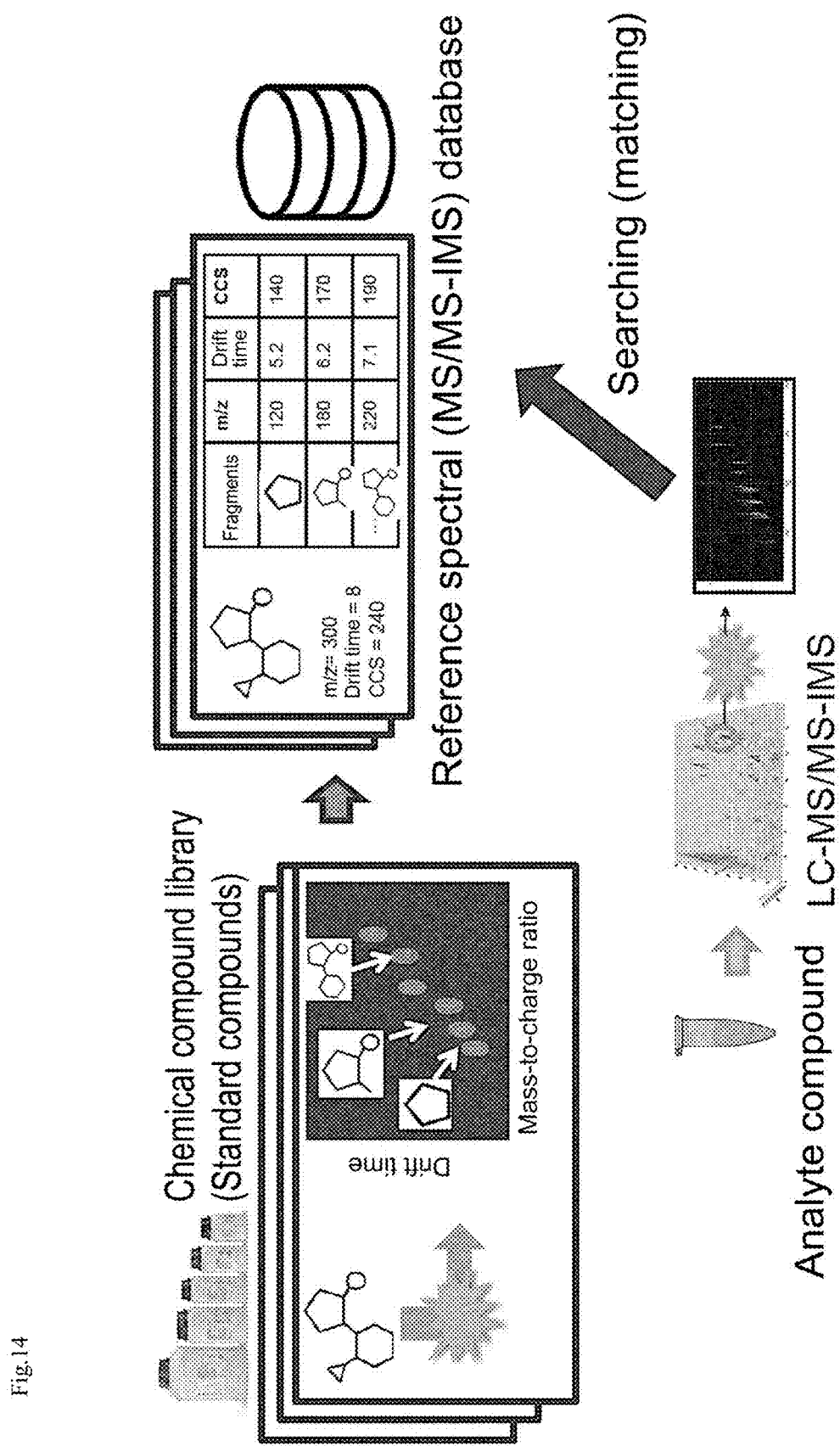
FIG. 14 is a diagram showing another example of the method (Embodiment 1) of the present invention.
Figure 15:
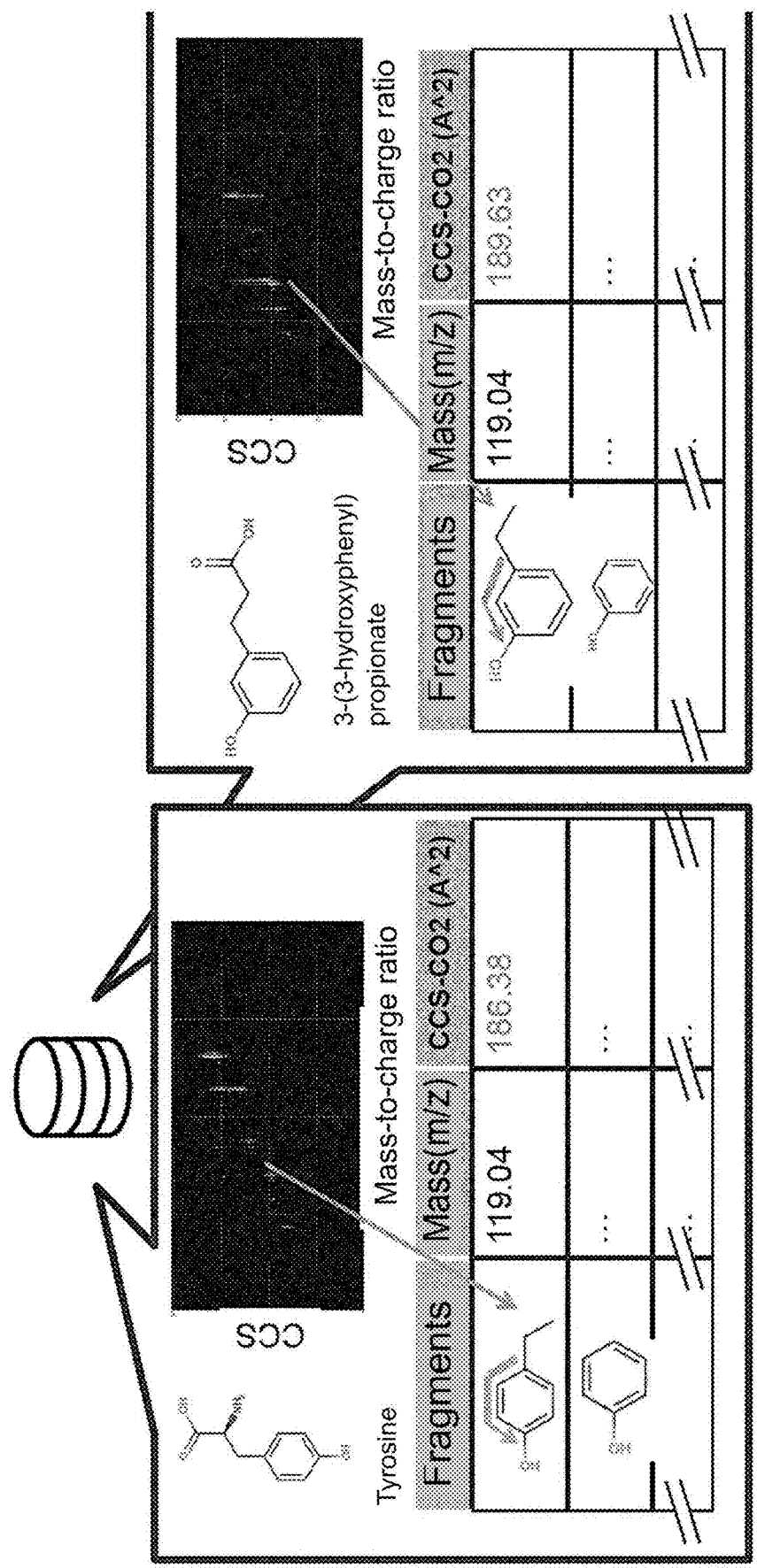
FIG. 15 shows another example of a reference spectral database.

In FIG. 14, other example of the method of this embodiment is shown. In FIG. 14, a specific compound is exemplified for the reference spectral data, but the present invention is not limited to this, and reference spectral data of a wide variety of compounds can be used for construction of the reference spectral database. In addition, in FIG. 15, another example of the reference spectral database is shown. In this figure, detailed data on masses (mass-to-charge ratios) and ion mobilities of fragment ions (substructures) of the standard compound are shown. In the present invention, by matching the spectral data of the fragment ions of the analyte compound to the reference spectral data as shown in this figure, that is, by matching the masses (mass-to-charge ratios) and ion mobilities, identification of the analyte compound becomes possible. Incidentally, in this figure, a specific compound is exemplified for the reference spectral data, but the present invention is not limited to this, and reference spectral data of a wide variety of compounds can be used for construction of the reference spectral database.

Second Embodiment

Figure 7:
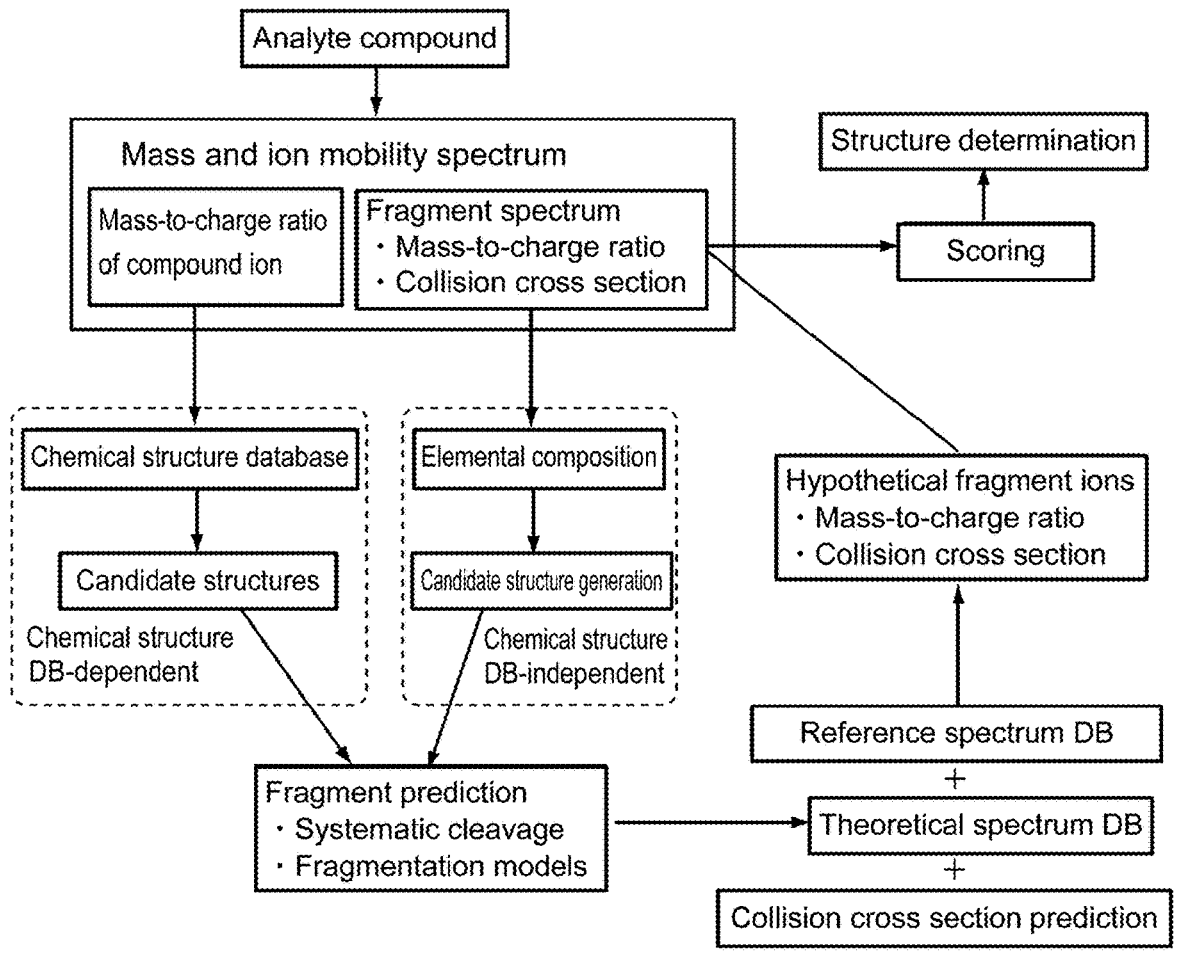
FIG. 7 is a diagram showing an outline of another example (Embodiment 2) of the method of the present invention.

The second embodiment of the present invention is the above-mentioned method for identifying the structure of an analyte compound, and the subject of the method is a person. In the present embodiment, among the procedures carried out by a person, a procedure that can be interpreted as being executed on a computer can be interpreted as, for example, a person makes the computer to carry out the procedure. The present embodiment is a method for identifying a chemical structure, when the analyte compound is not registered in the above-mentioned reference spectral database of standard compounds. The present embodiment includes the above-mentioned mass-elemental composition deduction step, the candidate structure acquisition step, the estimated fragment ions structure acquisition step, the estimated fragment ion collision cross section acquisition step and the matching step. In FIG. 7, an outline of an example of the present embodiment is shown.

1. Mass-Elemental Composition Deduction Step

In this step, first, as described in "1-1. Measurement for mass-to-charge ratio (m/z) and collision cross section (CCS)" of the above-mentioned embodiment 1, the mass-to-charge ratio and collision cross section of the precursor ion and fragment ions of the analyte compound are measured. From the measurement results, mass and/or elemental composition of the analyte compound is/are deduced. The elemental composition of the analyte compound is deduced taking into account ionized adduct type and measurement error, and then filtered with valence rules and elemental ratio. Candidate molecular structure is estimated based on the candidate elemental composition, and further selected by applying the same process to the fragment ions of the analyte compound.

2. Candidate Structure Acquisition Step

In the present embodiment, the present step is carried out by bot the chemical structure database dependent method and independent method. Incidentally, the present step is not necessarily carried out by both the chemical structure database dependent method and independent method and, for example, it may be carried out by the chemical structure database dependent method alone, or may be carried out by the chemical structure database independent method alone. In the present embodiment, a candidate structure is searched by the chemical structure database dependent method as mentioned below, and a candidate structure is generated by the chemical structure database independent method.

2-1. Chemical Structure Database Dependent Method

As the chemical structure database, for example, PubChem and ChEBI may be mentioned, but not limited to these. When structure determination is carried out by searching the true structure in the list of candidate chemical structures in the chemical structure database, the search is carried out by matching the mass of the analyte compound based on the measured mass-to-charge ratio of the analyte compound to select a candidate structure ("Chemical structure DB-dependent" in FIG. 7). When the analyte compound is measured in a positive ion mode, positive ion adduct types such as $[M+H]+$, $[M+Na]+$ and the like are considered, and the mass of the analyte compound is matched to the mass of the candidate structure. When the analyte compound is measured in a negative ion mode, negative ion adduct types such as $[M-H]-$ and the like are considered, and the mass of the analyte compound is matched to the candidate structure.

2-2. Chemical Structure Database Independent Method

When the candidate structure is determined without using any candidate information, for example, the chemical structure database, a candidate structure is generated by an algorithm of molecular structure generation. Specifically, for example, using a theoretical molecular structure generation tool such as Open Molecular Generator (Peironcely et al., J. Cehmoinfo. (2012) 4: 21), MOLGEN or the like, a theoretically existing candidate structure is generated based on the deduced elemental composition of the analyte compound.

3. Estimated (Hypothetical) Fragment Ion Structure Acquisition Step

After searching and selecting a candidate structure by the above-mentioned chemical structure database dependent method and generating the candidate structure by the above-mentioned chemical structure database independent method, from these candidate structures of the analyte compound, estimated (hypothetical) fragment ions of the candidate structure of the analyte compound is generated (predicted) with taking into account systematic cleavage and/or a fragmentation model and structure rearrangement by the fragmentation in the same manner as described in "2-2. Construction of reference spectral database" of the above-mentioned embodiment 1.

4. Estimated (Hypothetical) Fragment Ion Collision Cross Section Acquisition Step The collision cross sections of the hypothetical fragment ions are acquired by searching from the reference spectral database mentioned above and the theoretical fragment database mentioned later. Incidentally, in this step, it is not always necessary to search from the reference spectral database, and only the theoretical spectral database may be searched from. As a result of this search, when fragment ions having the same structures as the hypothetical fragment ions are found, the registered collision cross sections for the fragment ions are retrieved. When fragment ions having the same structures as the hypothetical fragment ions are not found, the collision cross sections of these hypothetical fragments are calculated based on the structure of the hypothetical fragments by the method mentioned later. For example, the collision cross sections of the hypothetical fragment acquired by the calculation can be registered in the theoretical database together with the structures of the same hypothetical fragments. According to this procedure, the fragment structures covered by the theoretical database are enriched.

4-1. Theoretical spectral database

Figure 6:
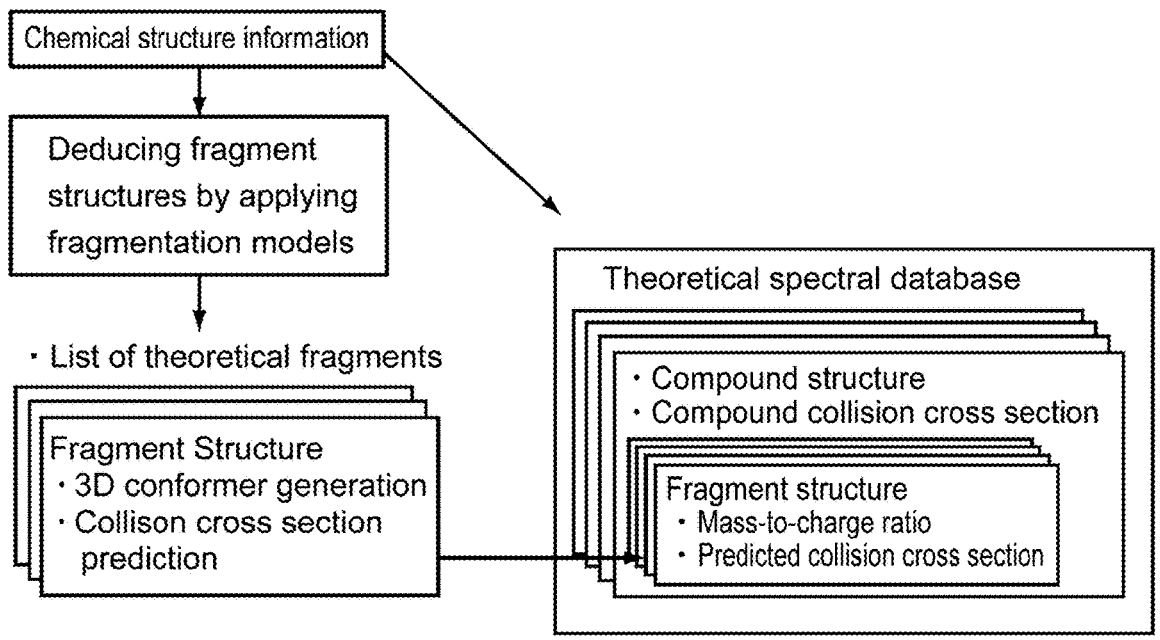
FIG. 6 is a diagram showing an example of a procedure for constructing a theoretical spectral database.

The above-mentioned theoretical spectral database includes the mass-to-charge ratios and the theoretically calculated collision cross sections of the fragment ions. Such a database can be constructed as follows. That is, first, a two-dimensional structure of the compound is acquired from resources of chemical structures such as a chemical structure database as a textual chemical structure identifier such as InChI and SMILES or a file such as SDF. Then, the identifier or file is converted into a 2D structure by using a chemoinformatics library such as RDKit, and the structures of the fragment ions of the compound are deduced by applying fragmentation models and rules as described in "2-2. Construction of reference spectral database" of the above-mentioned first embodiment. Then, the mass-to-charge ratios and collision cross sections thereof are calculated by using the generated fragment structures. Calculation of collision cross section is described in detail below. The structures of the fragment ions are registered in the theoretical spectral database together with the calculated mass-to-charge ratios and collision cross sections, and tagged with the calculation method (FIG. 6).

4-2. Calculation of Theoretical Collision Cross Section

Theoretical collision cross section is calculated as follows. That is, first, a 2D structure of the compound described as a chemical identifier such as InChI and SMILES or a file such as SDF is acquired from a chemical structure database such as PubChem. With respect to most acidic or basic amino acids, they are estimated using a pKa calculation tool such as Marvin pKa plugin (ChemAxon), chemoinformatics library and the like to predict protonation, deprotonation and other adduction sites. The ion form of a compound is generated by attaching an adduct such as proton, sodium and the like to the most basic atom. In the case of a negative ion, a hydrogen connected to the most acidic atom is removed to generate a negative ion structure.

For example, 100 conformers for the precursor ions of a compound are generated, and their structures are optimized by applying MMFF94 molecular force fields using a chemoinformatics tool kit such as RDKit. The conformation with the lowest energy is selected, and the electron distribution is calculated by density functional theory with B3LYP exchange-correlation function and 6-31 g*basis set using a computational chemistry tool such as Gaussian. The collision cross sections are calculated by the Trajectory method or the Exact Hard Sphere method using MOBCAL software, which is modified for the buffer gas used for ion mobility analysis (for example, $N_2$ and $CO_2$).

4-3. Prediction of Collision Cross Section by Machine Learning Model

Figure 8:
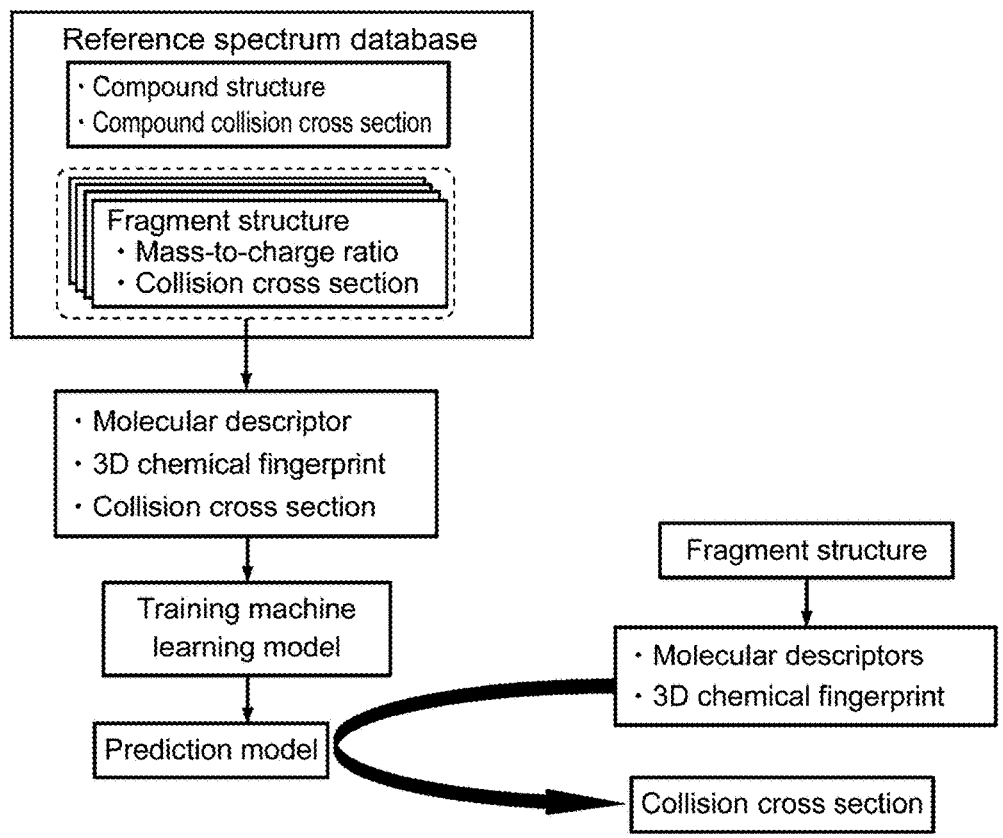
FIG. 8 is a diagram showing an example of a procedure for predicting collision cross section by a machine learning model.

In this approach, the collision cross sections of the precursor ion and fragment ions of a compound are predicted by a statistical and machine learning approach (FIG. 8).

With regard to the deduced structure of each fragment ion in the reference spectral database, a molecular descriptor and a fingerprint are calculated as follows. A molecular descriptor generator such as PaDEL-Descriptor is used to generate the molecular descriptor (constitutional, WHIM, topological, fingerprint). A circular ECFP fingerprint is generated with a chemoinformatics tool kit such as RDKit. With regard to the 3D conformer fingerprint and descriptor, first, conformer candidates are generated for each compound and its fragment ions structure as described in "4-2. Calculation of theoretical collision cross section" of the present embodiment. A spherical extended 3D fingerprint (E3FP) is generated by E3FP algorithm. The 3D conformer related values such as volume, molecular surface area and the like are calculated from the optimized 3D conformer described in "4-2. Calculation of theoretical collision cross section" of the present embodiment.

The observed molecular descriptor and fingerprint are used as a training data set to build a support vector regression model that predicts the collision cross section using a machine learning library such as Scikit-learn. The combination of two parameters: constraint violation cost and gamma are evaluated using training data via a cross-validation test. A pair of parameters that gives the best minimum mean squared error for prediction is selected for the prediction model.

5. Matching Step

In this step, with regard to each structures of the predicted fragment ions for each candidate structure of the analyte compound, the mass-to-charge ratios and collision cross sections of the candidate fragments (hypothetical fragment ions) structures are acquired by searching the same structures from the reference spectral database and the theoretical spectral database. When the candidate fragment structures are not found in these databases, calculation and prediction of the collision cross sections are carried out by the above-mentioned 4-2 and 4-3. Incidentally, at this time, by registering the collision cross section of the calculated fragment ions in the theoretical spectral database, the database can be enriched. Matching is carried out, for example, as follows. That is, first, the mass-to-charge ratios and collision cross sections derived from the standard compounds or hypothetical fragment ions are matched to the mass-to-charge ratios and collision cross sections in the spectral data of the fragment ions of the analyte compound. In such a manner, each compound candidate is evaluated by the scoring function shown below based on the number of matched pairs of the mass-to-charge ratio and the collision cross section and the peak intensity of the fragment ions.

$$\sum_{i=0}^{m} P_i I_i W_i \qquad \text{[Numerical formula 2]}$$

wherein, m is a number of fragment ions in the spectral data of the measured analyte compound. When the mass-to-charge ratio and collision cross section of a hypothetical fragment ion is matched to the mass-to-charge ratio and collision cross section of a measured fragment ion, then $P_i=1$. When the mass-to-charge ratio and collision cross section of a hypothetical fragment ion is not matched to the mass-to-charge ratio and collision cross section of a measured fragment ion, then $P_i=0$. $I_i$ is the intensity of the peak of the measured fragment ion. $W_i$ is a weight factor. $W_i=1$ when the collision cross section is acquired from the reference spectral database. $W_i=0.8$ or 0.6, when the collision cross section is derived from "4-2. Calculation of theoretical collision cross section" or "4-3. Prediction of collision cross section by machine learning model", respectively. The acquired scores are used to compare candidates, and the candidate showing the top score is determined to be the real structure of the analyte compound. Incidentally, for evaluation of the candidate, not only the above-mentioned function is strictly utilized, but also a similar function that considers the number of matched fragment ions and those signal intensities can be utilized.

By matching as mentioned above, according to the method of the present embodiment, it is possible to identify the structure of a compound even if the corresponding compound is not registered in the reference spectral database of the standard compound or the standard sample.

Figure 16:
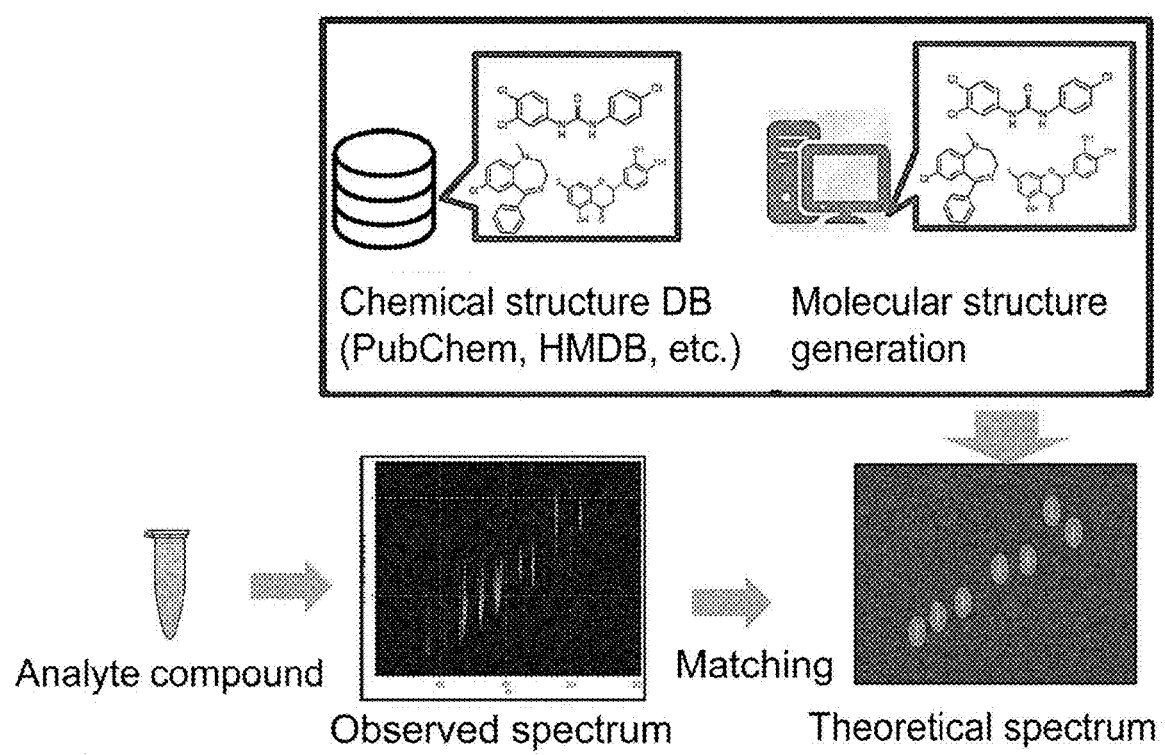
FIG. 16 is a diagram showing another example of Embodiment 2.

In FIG. 16, other example of the method of this embodiment is shown. In FIG. 16, a specific compound is exemplified in the chemical structure database and the molecular structure generation, but the present invention is not limited to this, and can be utilized for the chemical structure database of a wide variety of compounds and the molecular structure generation of a wide variety of compounds.

Figure 17:
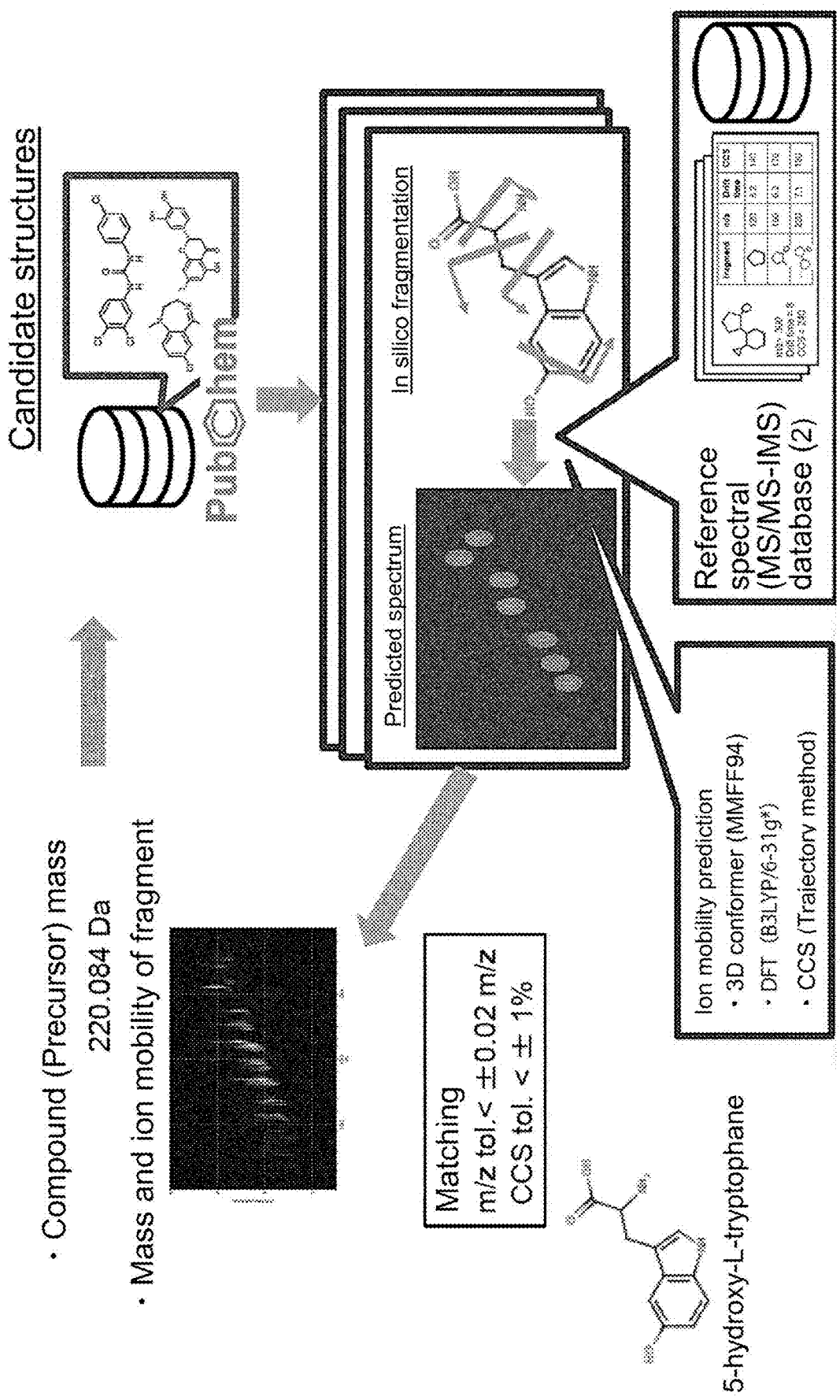
FIG. 17 is a diagram showing a more specific example of Embodiment 2.

In FIG. 17, a more specific example of the method of the present embodiment is shown. Incidentally, in FIG. 17, a specific compound is exemplified, but the present invention is not limited to this, and according to the present invention, the structures of a wide variety of compounds can be identified.

Third Embodiment

Figure 9:
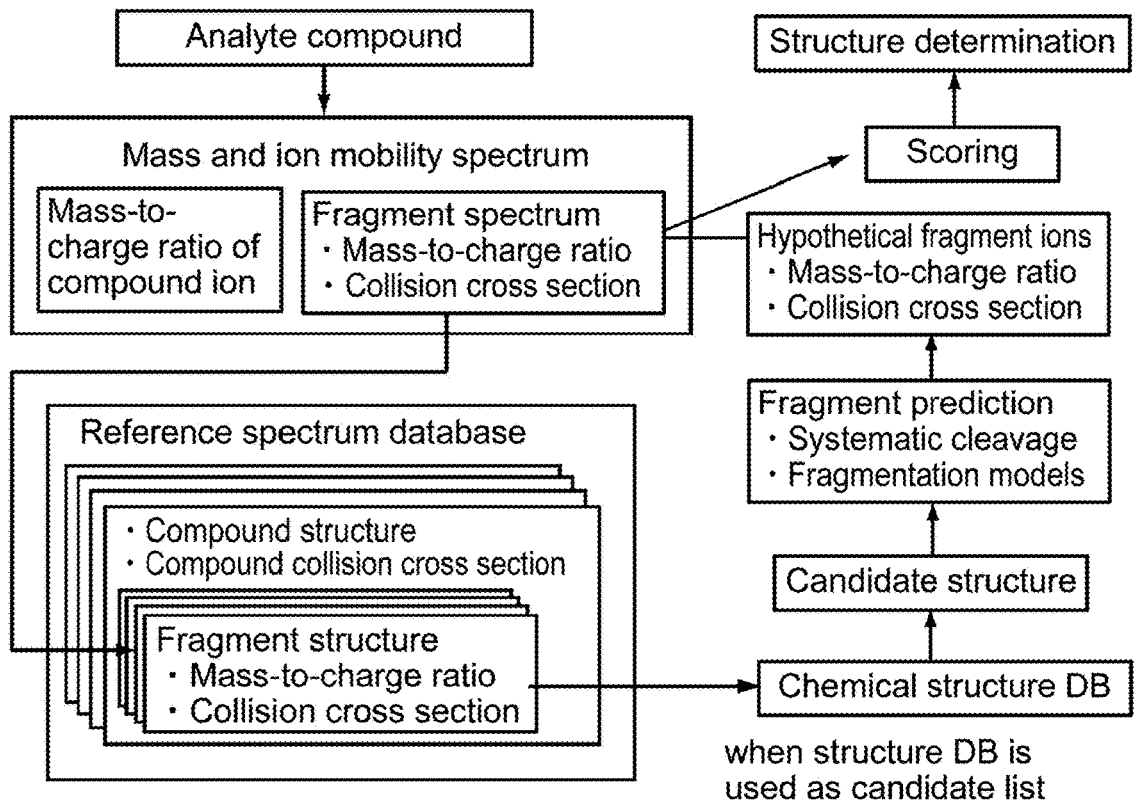
FIG. 9 is a diagram showing an outline of an example (Embodiment 3) of the method of the present invention.
Figure 10:
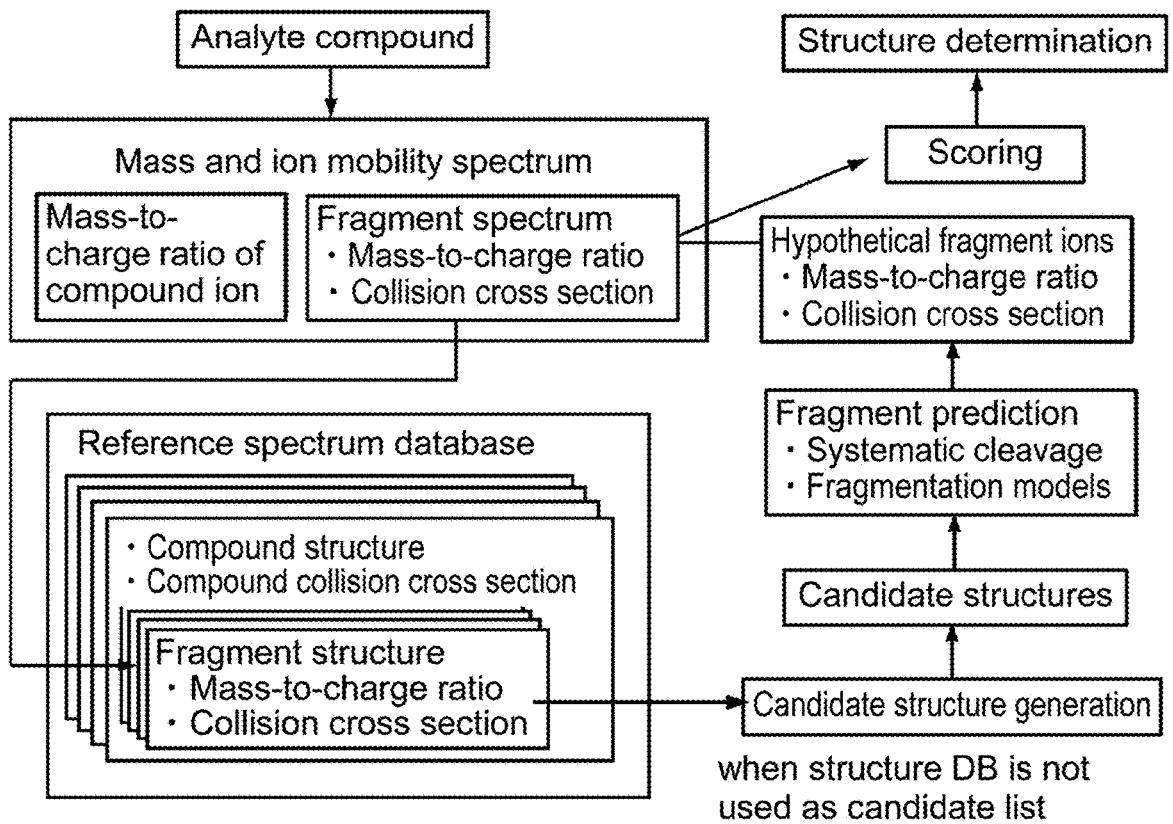
FIG. 10 is a diagram showing an outline of another example of Embodiment 3.
Figure 11:
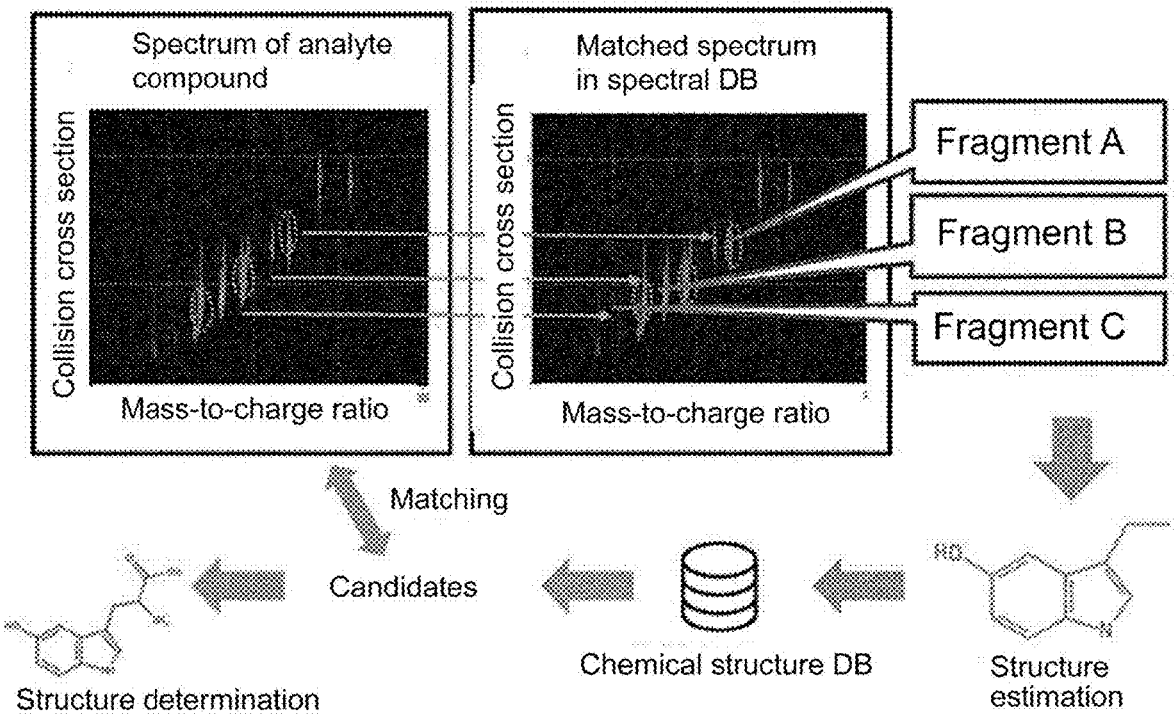
FIG. 11 is a diagram showing an outline of still another example of Embodiment 3.

The first embodiment of the present invention is the above-mentioned method for identifying the structure of an analyte compound, and the subject of the method is a person. In the present embodiment, among the procedures carried out by a person, a procedure that can be interpreted as being executed on a computer can be interpreted as, for example, a person makes the computer to carry out the procedure. The present embodiment includes the above-mentioned first matching step, the substructure acquisition step, the candidate structure acquisition step, the estimated fragment ions structure acquisition step, the estimated (hypothetical) fragment ions collision cross section acquisition step, and the second matching step. The method of the present embodiment may sometimes be referred to as the spectral similarity method. In FIGS. 9 to 11, an example of the method of the present embodiment is shown.

1. First Matching Step

The present step can be carried out in the same manner as in "2. Matching step" of the above-mentioned embodiment 1. That is, the measured spectral data of the fragment ions of the analyte compound is searched against the reference spectral database (FIGS. 9 to 11).

2. Substructure Acquisition Step

When the fragment ions of the analyte compound have multiple fragment ions whose mass-to-charge ratios and collision cross sections are found to be matched with a predetermined tolerance in the reference spectral data, the registered structures of these fragment ions are acquired. Here, the structures of these fragment ions can be seen as the candidates of the substructures of the analyte compound. This is because these fragment ions have the same unique combination of the mass-to-charge ratio and the collision cross section. In other words, it can be deemed that such standard compounds and the analyte compound are likely to have these fragment ions as common substructures with high possibility.

Search for the candidate structure of the analyte compound can be carried out, for example, by "2-1. Chemical structure database dependent method" of the above-mentioned embodiment 2. Then, with regard to the searched candidate structure, it is further searched whether or not it has the substructure searched from the reference spectral database (FIGS. 9 and 11).

When the candidate structure determination is achieved without any previously selected structure candidates (that is, without using any chemical structure database), the candidate structures are generated by, for example, a molecular structure generator algorithm as described in "2-2. Chemical structure database independent method" of the above-mentioned embodiment 2 ((FIG. 10). In addition, the structure or structure group of the fragment ions acquired from the reference spectral database are made as a starting point, and therefrom, all theoretically possible structures that satisfy the composition formula of the observed analyte compound are generated and they are made as candidate structures. Such candidate structure generation can be carried out, for example, by a theoretical chemical structure generation algorithm such as Open Molecular Generator (Peironcely et al., J. Cheminfo. (2012) 4: 21) or a virtual chemical reaction tool such as RetroPath2 (Delepine et al. Metabolic Engineering (2018), 45: 158-170).

3. Estimated Fragment Ion Structure Acquisition Step

The present step can be carried out in the same manner as in "3. Estimated (hypothetical) fragment ions structure acquisition step" of the above-mentioned embodiment 2 (FIGS. 9 to 11).

4. Estimated (Hypothetical) Fragment Ion Collision Cross Section Acquisition Step The present step can be carried out in the same manner as in "4. Estimated (hypothetical) fragment ion collision cross section acquisition step" of the above-mentioned embodiment 2 (FIGS. 9 to 11).

5. Second Matching Step

The present step can be carried out in the same manner as in "5. Matching step" of the above-mentioned embodiment 2 (FIGS. 9 to 11).

By matching as mentioned above, the structures of various compounds can be further identified by combining various databases and theories.

Figure 18:
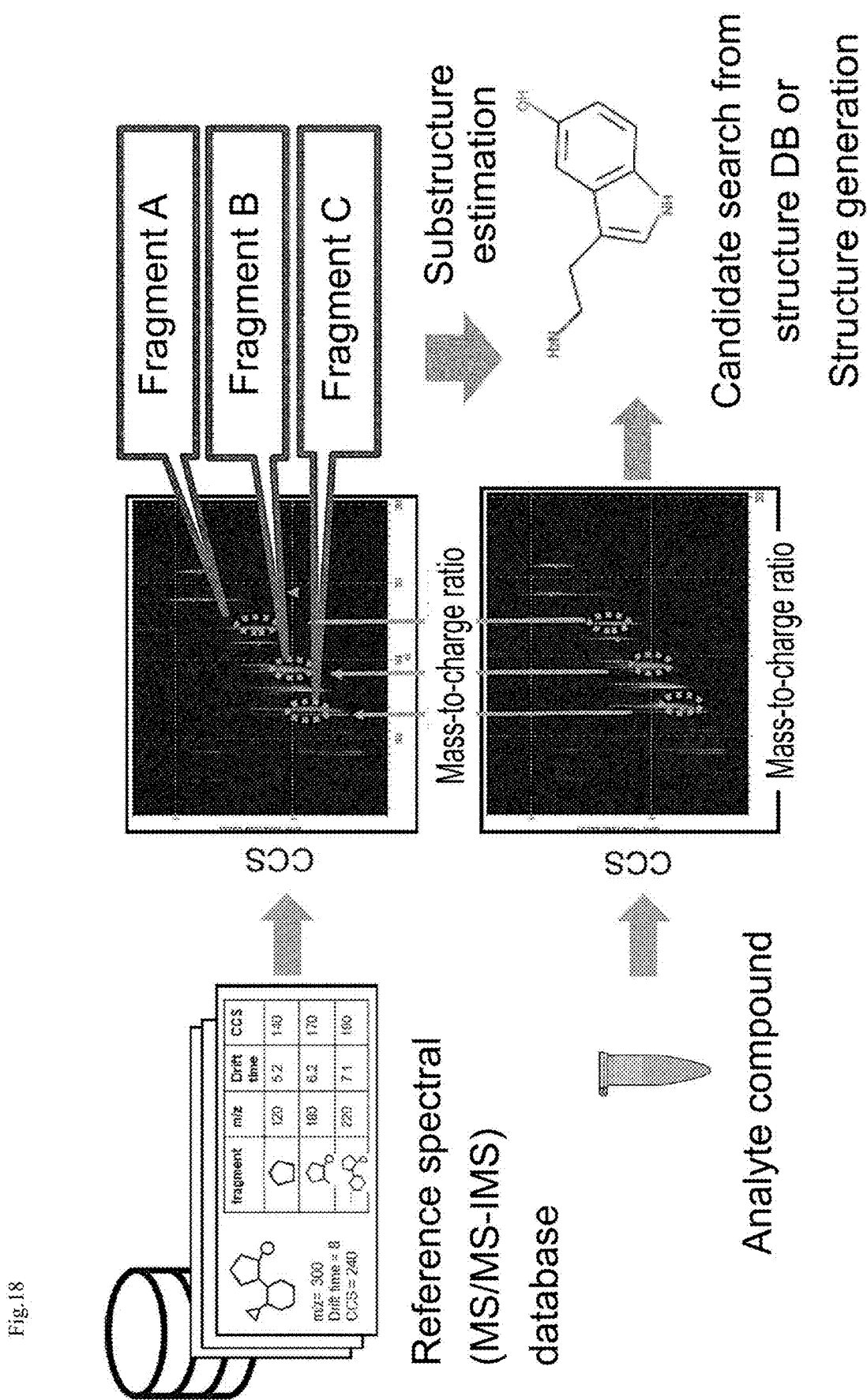
FIG. 18 is a diagram showing another example of Embodiment 3.

In FIG. 18, other example of the method of the present embodiment is shown. As shown in this figure, in the other example of the present embodiment, spectral similarity is evaluated between the spectral data of the analyte compound and the reference spectral database. Then, by matching the "mass (mass-to-charge ratio) and ion mobility" of both spectral data, a common substructure is clearly detected, and as a result, a candidate structure can be generated. Incidentally, in FIG. 18, a specific compound is exemplified for the reference spectral data, but the present invention is not limited to this, and the reference spectral data of a wide variety of compounds can be utilized for construction of a reference spectral database.

Figure 19:
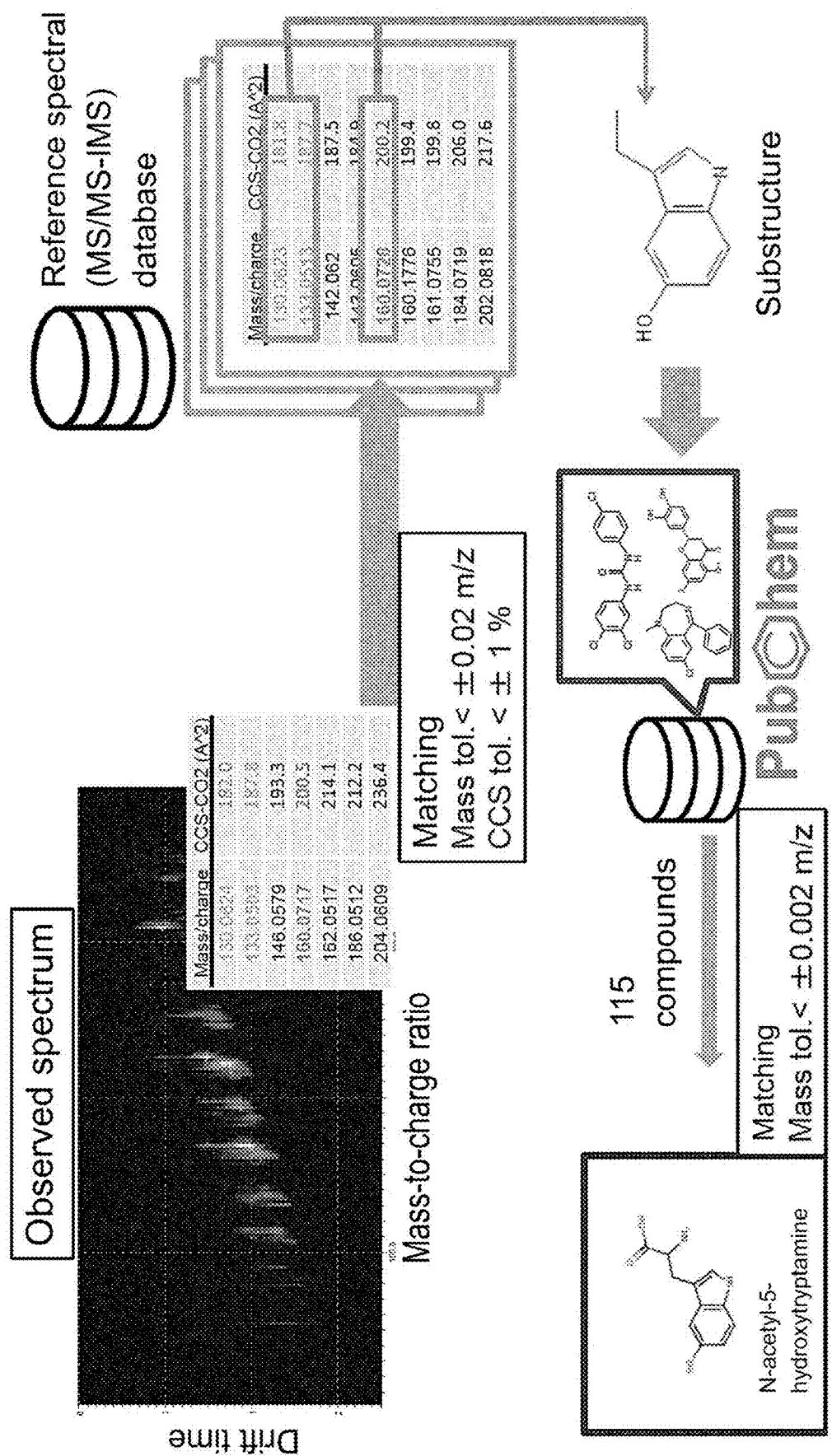
FIG. 19 is a diagram showing a more specific example of Embodiment 3.

In FIG. 19, a more specific example of the method of the present embodiment is shown. Incidentally, in FIG. 19, a specific compound is exemplified, but the present invention is not limited to this, and according to the present invention, the structures of a wide variety of compounds can be identified.

Fourth Embodiment

Figure 12:
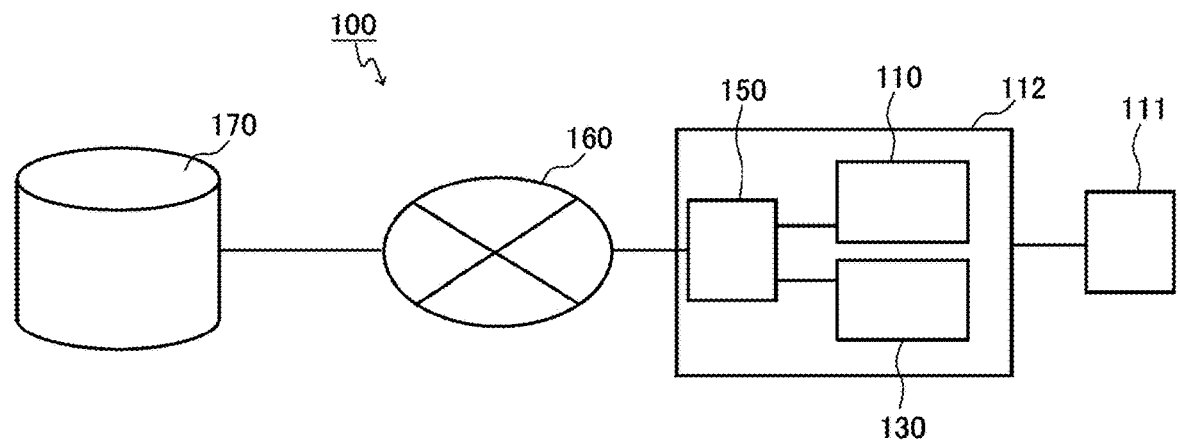
FIG. 12 is a block diagram showing an example (Embodiment 4) of the system of the present invention.

The fourth embodiment of the present invention is a system for identifying the structure of a compound, and includes a spectral data generation means, a reference spectral database, a matching means and an output means as mentioned above, and the spectral data generation means and the output means are connected to the reference spectral database and the matching means via a communication network outside the system. In FIG. 12, a configuration of an example of the present embodiment is shown. As shown in FIG. 12, this system 100 is provided with a spectral data generation means 110, an output means 130, a communication interface 150 and a server 170. The spectral data generation means 110 and the output means 130 are electrically connected to the communication interface 150. And the communication interface 150 and the server 170 are connected via a line network 160. The spectral data generation means 110 is, specifically, for example, a CPU of a client terminal 112 connected to a mass spectrometry instrument 111.

In this system, a matching means is provided at the server 170 side, and a reference spectral database is stored in the server 170. For example, spectral data generated by the spectral data generation means 110 is transmitted to the server 170, and the spectral data is matched to the reference spectral data at the server 170, as mentioned above. Also, the matching result is output by the output means 130.

According to the present embodiment, the server has a matching means, advanced arithmetic processing required for the matching can be carried out in the server, and as a result, for example, the structure of the compound can be identified at a higher speed. In addition, the reference spectral database is stored in the server, so that the database can be updated more frequently as compared with the case where the reference spectral database is stored in individual client terminals, and as a result, for example, it is possible to identify the structures of more diverse compounds.

The system of the present embodiment may be, for example, a system corresponding to any of the above-mentioned embodiments 1 to 3, and can execute each step explained in the above-mentioned embodiments 1 to 3. For example, the server may include various kinds of databases such as the above-mentioned chemical structure database, the theoretical spectral database and the like. Also, in the system of the present embodiment, the spectral data generation means is a CPU of a client terminal, but the present invention is not limited to this, and, for example, the server may have the spectral data generation means. When such an embodiment is employed, for example, the spectral data generation can be carried out on the server side so that, for example, the structure of the compound can be identified at a further higher speed.

Fifth Embodiment

Figure 13:
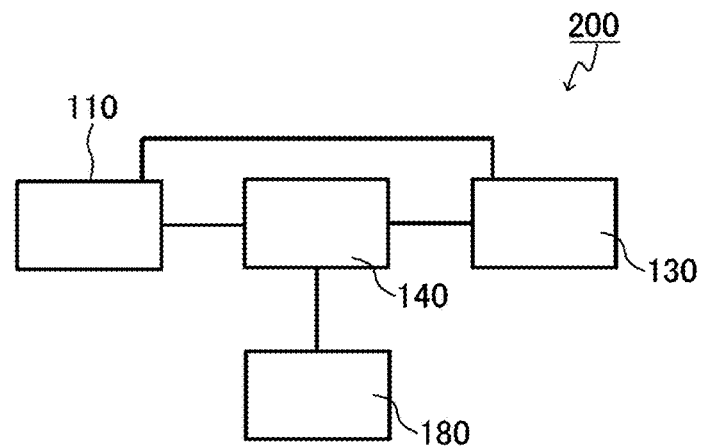
FIG. 13 is a block diagram showing an example (Embodiment 5) of the apparatus of the present invention.

The fifth embodiment of the present invention is an apparatus for identifying the structure of a compound, and includes a spectral data generation means, a reference spectral database and a matching means as mentioned above. In FIG. 13, a constitution of an example of the apparatus of the present embodiment is shown. As shown in FIG. 13, this apparatus 200 is provided with a spectral data generation means 110, an output means 130, a matching means 140 and a reference spectral database 180. The spectral data generation means 110 is electrically connected to the output means 130 and the matching means 140. The matching means 140 is electrically connected to the output means 130 and the reference spectral database 180. The spectral data generation means 110 and the matching means 140 are, for example, CPUs. The output means 130 is, for example, a display such as a liquid crystal display. The output means 130 outputs the matching result obtained by the matching means 140, and, for example, can output the spectral data generated by the spectral data generation means 110. The reference spectral database 180 is, for example, an auxiliary storage device, and the reference spectral data is data stored in the auxiliary storage device. The spectral data generation means 110 is, for example, connected to a mass spectrometry instrument.

According to the present embodiment, for example, the structure of an analyte compound can be identified with the single apparatus even when it is not in a communication environment. Also, for example, the reference spectral database may be updated in a communication environment.

The apparatus of the present embodiment may be, for example, an apparatus which corresponds to any of the above-mentioned embodiments 1 to 3, and can execute each step explained in the above-mentioned embodiments 1 to 3. For example, the present apparatus may include various kinds of databases such as the above-mentioned chemical structure database, theoretical spectral database and the like. These databases may be also updated, for example, in a communication environment.

Sixth Embodiment

The sixth embodiment of the present invention is a method for identifying the structure of a compound, and each step of the method is executed by a computer. The present embodiment includes the above-mentioned and the matching step. The method of the present embodiment may be executed by, for example, the system described in the above-mentioned embodiment 4 or the apparatus described in the above-mentioned embodiment 5, and among each step explained in the above-mentioned embodiments 1 to 3, the part that is executed by the computer can be executed.

Seventh Embodiment

The seventh embodiment of the present invention is a program capable of executing the above-mentioned compound identification method on a computer. The present embodiment may be recorded, for example, on a recording medium. As the recording medium, for example, there may be mentioned a random-access memory (RAM), a read-only memory (ROM), a hard disk (HD), a USB memory, an optical disk, a floppy (registered trademark) disk (FD) and the like.

Hereinabove, the present invention has been explained with reference to the embodiments, but the present invention is not limited to the above-mentioned embodiments. Various modification can be done to the constitution and details of the present invention within the range of the present invention that can be understood by those skilled in the art.

UTILIZABILITY IN INDUSTRY

As mentioned above, according to the present invention, it is possible to provide a method and a system for identifying the structure of a compound, which can identify the structures of various compounds. Therefore, the present invention can be applied to a wide range of fields including various kinds of fields such as physiology, medicine, food, environment and the like.

EXPLANATION OF REFERENCE NUMERALS

100 System (Embodiment 4)
110 Spectral data generation means

111 Mass spectrometry instrument
112 Client terminal
130 Output means
140 Matching means
150 Communication interface
160 Line network
170 Server
180 Reference spectral database
200 Apparatus (Embodiment 5)
(deleted)
(deleted)
(deleted)
(deleted)
(deleted)

The invention claimed is:

1. A method for identifying the structure of a compound, which comprises:
   deducing a mass and/or elemental composition of an analyte compound from mass-to-charge ratios (m/z) of fragment ions and a precursor ion of the analyte compound,
   acquiring a candidate structure by searching from chemical structures included in a chemical structure database based on the deduced mass and/or elemental composition of the analyte compound or generating a theoretically existing structure based on the elemental composition,
   acquiring structures of estimated fragment ions of the candidate structure by systematic bond cleavage or a fragmentation prediction model,
   acquiring collision cross sections (CCS) of the estimated fragment ions by searching from a reference spectral database in which structures, mass-to-charge ratios and collision cross sections of fragment ions of a standard compound are combined and a theoretical spectral database comprising structures of fragment ions and theoretically calculated CCSs, or by calculation and prediction based on the structures of the estimated fragment ions, and
   matching the measured m/z ratios and CCSs of fragment ions of the analyte compound to the acquired m/z ratios and CCSs of the estimated fragment ions of the candidate structure.

2. The method according to claim 1, wherein
   in acquiring a candidate structure, instead of or in addition to acquiring a candidate structure from chemical structures included in a chemical structure database, a candidate structure is acquired from chemical structures generated with an algorithm of molecular structure generation for generating a theoretically possible structure based on the estimated elemental composition of the analyte compound.

3. A method for identifying the structure of a compound, which comprises:
   matching measured mass-to-charge ratios (m/z) and collision cross sections (CCS) of fragment ions of an analyte compound to a reference spectral database in which structures, mass-to-charge ratios and collision cross sections of fragment ions of a standard compound are combined and a theoretical spectral database comprising structures of fragment ions and theoretically calculated CCSs thereof,
   acquiring a registered structure of fragment ions matched with a predetermined tolerance as a potential substructure of the analyte compound,
   acquiring a candidate structure of the analyte compound by searching a chemical structure having the substructure in a chemical structure database,
   acquiring structures of estimated fragment ions of the candidate structure by systematic bond cleavage or a fragmentation prediction model,
   acquiring CCSs of the estimated fragment ions by searching from a reference spectral database in which structures, mass-to-charge ratios and collision cross sections of fragment ions of a standard compound are combined and a theoretical spectral database comprising structures of fragment ions and theoretically calculated CCSs thereof, or by calculation and prediction based on the structures of the estimated fragment ions, and
   matching the measured m/z ratios and CCSs of fragment ions of the analyte compound to the m/z ratios and the acquired CCSs of the estimated fragment ions of the candidate structure.

4. The method according to claim 3, wherein
   in acquiring a candidate structure, instead of acquiring a candidate structure by searching a chemical structure having the substructure in a chemical structure database, a candidate substructure is acquired by matching the observed mass-to-charge ratios and collision cross sections of the fragment ions to a reference spectral database in which structures, mass-to-charge ratios and collision cross sections of fragment ions of a standard compound are combined and a theoretical spectral database comprising structures of fragment ions and theoretically calculated CCSs thereof, and a candidate structure is acquired from chemical structures generated with an algorithm of molecular structure generation for generating a theoretically possible structure based on the substructure and the estimated elemental composition of the analyte compound.

5. A system for identifying the structure of a compound, which comprises:
   a spectral data generation means for generating spectral data in which measured mass-to-charge ratios (m/z) and collision cross sections (CCS) of fragment ions of an analyte compound are combined, from a result of mass spectrometry of the analyte compound,
   a reference spectral database comprising reference spectral data in which structures of fragment ions of a standard compound and mass-to-charge ratios and collision cross sections of fragment ions thereof are combined,
   a theoretical spectral database comprising structures of fragment ions and theoretically calculated CCSs thereof,
   a matching means for matching the spectral data to data in the reference spectral database and the theoretical spectral database,
   a means for generating a candidate structure from structural information in the reference spectral database and the theoretical spectral database, and
   an output means for outputting a result obtained by the matching means,
   wherein the spectral data generation means and the output means are connected to the reference spectral database, the theoretical spectral database, the candidate information generation means and the matching means via a communication network outside the system.

6. A method for identifying the structure of a compound, which comprises:

deducing a mass and/or elemental composition of an analyte compound from mass-to-charge ratios (m/z) of fragment ions and a precursor ion of the analyte compound, acquiring a candidate structure by searching from chemical structures included in a chemical structure database based on the deduced mass and/or elemental composition of the analyte compound or generating a theoretically existing structure based on the elemental composition, acquiring structures of estimated fragment ions of the candidate structure by systematic bond cleavage or a fragmentation prediction model, acquiring collision cross sections (CCS) of the estimated fragment ions by searching from a reference spectral database in which structures, mass-to-charge ratios and collision cross sections of fragment ions of a standard compound are combined, or by calculation and prediction based on the structures of the estimated fragment ions, and matching the measured m/z ratios and CCSs of fragment ions of the analyte compound to the acquired m/z ratios and CCSs of the estimated fragment ions of the candidate structure.

7. A method for identifying the structure of a compound, which comprises:

deducing a mass and/or elemental composition of an analyte compound from mass-to-charge ratios (m/z) of fragment ions and a precursor ion of the analyte compound, acquiring a candidate structure by searching from chemical structures included in a chemical structure database based on the deduced mass and/or elemental composition of the analyte compound or generating a theoretically existing structure based on the elemental composition, acquiring structures of estimated fragment ions of the candidate structure by systematic bond cleavage or a fragmentation prediction model, acquiring collision cross sections (CCS) of the estimated fragment ions by searching from a theoretical spectral database comprising structures of fragment ions and theoretically calculated CCSs, or by calculation and prediction based on the structures of the estimated fragment ions, and matching the measured m/z ratios and CCSs of fragment ions of the analyte compound to the acquired m/z ratios and CCSs of the estimated fragment ions of the candidate structure.

8. A method for identifying the structure of a compound, which comprises:

matching measured mass-to-charge ratios (m/z) and collision cross sections (CCS) of fragment ions of an analyte compound to a reference spectral database in which structures, mass-to-charge ratios and collision cross sections of fragment ions of a standard compound are combined, acquiring a registered structure of fragment ions matched with a predetermined tolerance as a potential substructure of the analyte compound, acquiring a candidate structure of the analyte compound by searching a chemical structure comprising a substructure in a chemical structure database, acquiring structures of estimated fragment ions of the candidate structure by systematic bond cleavage or a fragmentation prediction model, acquiring CCSs of the estimated fragment ions by searching from a reference spectral database in which structures, mass-to-charge ratios and collision cross sections of fragment ions of a standard compound are combined, or by calculation and prediction based on the structures of the estimated fragment ions, and matching the measured m/z ratios and CCSs of fragment ions of the analyte compound to the m/z ratios and the acquired CCSs of the estimated fragment ions of the candidate structure.

9. The method according to claim 8, wherein in acquiring a candidate structure, instead of acquiring a candidate structure by searching a chemical structure having the substructure in a chemical structure database, a candidate substructure is acquired by matching the observed mass-to-charge ratios and collision cross sections of the fragment ions to a reference spectral database in which structures, mass-to-charge ratios and collision cross sections of fragment ions of a standard compound are combined, and a candidate structure is acquired from chemical structures generated with an algorithm of molecular structure generation for generating a theoretically possible structure based on the substructure and the estimated elemental composition of the analyte compound.

10. A method for identifying the structure of a compound, which comprises:

matching measured mass-to-charge ratios (m/z) and collision cross sections (CCS) of fragment ions of an analyte compound to a theoretical spectral database comprising structures of fragment ions and theoretically calculated CCSs thereof, acquiring a registered structure of fragment ions matched with a predetermined tolerance as a potential substructure of the analyte compound, acquiring a candidate structure of the analyte compound by searching a chemical structure having the substructure in a chemical structure database, acquiring structures of estimated fragment ions of the candidate structure by systematic bond cleavage or a fragmentation prediction model, acquiring CCSs of the estimated fragment ions by searching from a theoretical spectral database comprising structures of fragment ions and theoretically calculated CCSs thereof, or by calculation and prediction based on the structures of the estimated fragment ions, and matching the measured m/z ratios and CCSs of fragment ions of the analyte compound to the m/z ratios and the acquired CCSs of the estimated fragment ions of the candidate structure.

11. The method according to claim 10, wherein in acquiring a candidate structure, instead of acquiring a candidate structure by searching a chemical structure having the substructure in a chemical structure database, a candidate substructure is acquired by matching the observed mass-to-charge ratios and collision cross sections of the fragment ions to a theoretical spectral database comprising structures of fragment ions and theoretically calculated CCSs thereof, and a candidate structure is acquired from chemical structures generated with an algorithm of molecular structure generation for generating a theoretically possible structure based on the substructure and the estimated elemental composition of the analyte compound.

12. A system for identifying the structure of a compound, which comprises:

a spectral data generation means for generating spectral data in which measured mass-to-charge ratios (m/z) and collision cross sections (CCS) of fragment ions of an analyte compound are combined, from a result of mass spectrometry of the analyte compound, a reference spectral database comprising reference spectral data in which structures of fragment ions of a standard compound and mass-to-charge ratios and collision cross sections of fragment ions thereof are combined, a matching means for matching the spectral data to data in the reference spectral database, a means for generating a candidate structure from structural information in the reference spectral database, and an output means for outputting a result obtained by the matching means, wherein the spectral data generation means and the output means are connected to the reference spectral database, the candidate information generation means and the matching means via a communication network outside the system.

13. A system for identifying the structure of a compound, which comprises:

a spectral data generation means for generating spectral data in which measured mass-to-charge ratios (m/z) and collision cross sections (CCS) of fragment ions of an analyte compound are combined, from a result of mass spectrometry of the analyte compound, a theoretical spectral database comprising structures of fragment ions and theoretically calculated CCSs thereof, a matching means for matching the spectral data to data in the theoretical spectral database, a means for generating a candidate structure from structural information in the theoretical spectral database, and an output means for outputting a result obtained by the matching means, wherein the spectral data generation means and the output means are connected to the theoretical spectral database, the candidate information generation means and the matching means via a communication network outside the system.

14. A method for identifying the structure of a compound, which comprises:

deducing a mass and/or elemental composition of an analyte compound from mass-to-charge ratios (m/z) of a precursor ion of the analyte compound, acquiring a candidate structure by searching from chemical structures included in a chemical structure database based on the deduced mass and/or elemental composition of the analyte compound or generating a theoretically existing structure based on the elemental composition, acquiring structures of estimated fragment ions of the candidate structure by systematic bond cleavage or a fragmentation prediction model, acquiring collision cross sections (CCS) of the estimated fragment ions by searching from a reference spectral database in which structures, mass-to-charge ratios and collision cross sections of fragment ions of a standard compound are combined, or by calculation and prediction based on the structures of the estimated fragment ions, and matching the measured m/z ratios and CCSs of fragment ions of the analyte compound to the acquired m/z ratios and CCSs of the estimated fragment ions of the candidate structure.

15. A method for identifying the structure of a compound, which comprises:

deducing a mass and/or elemental composition of an analyte compound from mass-to-charge ratios (m/z) of a precursor ion of the analyte compound, acquiring a candidate structure by searching from chemical structures included in a chemical structure database based on the deduced mass and/or elemental composition of the analyte compound or generating a theoretically existing structure based on the elemental composition, acquiring structures of estimated fragment ions of the candidate structure by systematic bond cleavage or a fragmentation prediction model, acquiring collision cross sections (CCS) of the estimated fragment ions by searching from a theoretical spectral database including structures of fragment ions and theoretically calculated CCSs, or by calculation and prediction based on the structures of the estimated fragment ions, and matching the measured m/z ratios and CCSs of fragment ions of the analyte compound to the acquired m/z ratios and CCSs of the estimated fragment ions of the candidate structure.

* * * * *